(12) United States Patent
Hollinger

(10) Patent No.: US 9,144,714 B2
(45) Date of Patent: *Sep. 29, 2015

(54) BALL WITH CAMERA FOR RECONNAISSANCE OR RECREATION AND NETWORK FOR OPERATING THE SAME

(71) Applicant: Steven J. Hollinger, Boston, MA (US)

(72) Inventor: Steven J. Hollinger, Boston, MA (US)

(*) Notice: Subject to any disclaimer, the term of this patent is extended or adjusted under 35 U.S.C. 154(b) by 80 days.

This patent is subject to a terminal disclaimer.

(21) Appl. No.: 13/798,918

(22) Filed: Mar. 13, 2013

(65) Prior Publication Data

US 2013/0210563 A1 Aug. 15, 2013

Related U.S. Application Data

(63) Continuation-in-part of application No. 13/492,616, filed on Jun. 8, 2012, now Pat. No. 8,477,184, which is a continuation of application No. 12/772,198, filed on May 1, 2010, now Pat. No. 8,237,787.

(60) Provisional application No. 61/174,994, filed on May 2, 2009, provisional application No. 61/177,769, filed on May 13, 2009, provisional application No. 61/226,618, filed on Jul. 17, 2009.

(51) Int. Cl.
*A63B 43/00* (2006.01)
*H04N 5/232* (2006.01)
*H04N 5/225* (2006.01)

(52) U.S. Cl.
CPC .............. *A63B 43/00* (2013.01); *H04N 5/2251* (2013.01); *H04N 5/2252* (2013.01); *H04N 5/2258* (2013.01); *H04N 5/2259* (2013.01); *H04N 5/232* (2013.01); *H04N 5/23203* (2013.01); *H04N 5/23229* (2013.01); *H04N 5/23238* (2013.01)

(58) Field of Classification Search
CPC . H04N 5/2252; H04N 5/232; H04N 5/23203; H04N 5/23229; A63B 43/00
USPC .......................... 348/82, 143, 144, 151, 158, 348/208.99–208.2, 208.4, 208.6, 373–376
See application file for complete search history.

(56) References Cited

U.S. PATENT DOCUMENTS

| | | | |
|---|---|---|---|
| 6,995,787 B2 | 2/2006 | Adams | |
| 7,680,192 B2 | 3/2010 | Kaplinsky | |
| 8,237,787 B2 * | 8/2012 | Hollinger | 348/82 |
| 8,373,755 B2 | 2/2013 | Lee | |
| 8,477,184 B2 * | 7/2013 | Hollinger | 348/82 |
| 2002/0196339 A1 * | 12/2002 | Heafitz | 348/144 |
| 2007/0291143 A1 * | 12/2007 | Barbieri et al. | 348/264 |
| 2011/0164137 A1 * | 7/2011 | Schwartz et al. | 348/159 |

(Continued)

FOREIGN PATENT DOCUMENTS

DE 102011109990 11/2012

OTHER PUBLICATIONS

U.S. Appl. No. 12/683,537, filed Jul. 7, 2011, Steven Allen Schwartz.

(Continued)

*Primary Examiner* — Daniel M Pasiewicz

(57) ABSTRACT

A ball-shaped camera thrown or projected into an airborne trajectory, and an image capture system with network devices collaborating for the purpose of generating panoramic images and video sourced from network ball cameras, and ball cameras capable of capturing stable image and video while spinning, spiraling or precessing through a trajectory.

28 Claims, 21 Drawing Sheets

(56) References Cited

U.S. PATENT DOCUMENTS

2013/0222115 A1* 8/2013 Davoodi et al. .............. 340/10.1
2014/0146132 A1* 5/2014 Bagnato et al. ................ 348/36

OTHER PUBLICATIONS

Author: Levent Ozler, title: CTRUS Football Receives 2010 Red Dot Luminary Award, URL: www.dexigner.com/news/22058, date: Dec. 7, 2010.

Author: Hiawatha Bray, title: Camera-ball helps keep emergency responders safe, URL: http://www.bostonglobe.com/business/2013/01/21/surveillance-camera-ball/0iVRWJaRIIEGoQt9qRP04L/story.html, date: Jan. 21, 2013.

Author: Jacqueline Howard, title: BallCam Football Camera Shows Ball's-Eye View of Spiral Pass, URL: http://www.huffingtonpost.com/2013/02/28/ballcam-football-camera-video_n_2774957.html, date: Feb. 28, 2013.

URL: http://www.odfopt.com/eyeball_r1/eyeballr1_home.htm, pertinent information on website at least prior to Dec. 16, 2008.

* cited by examiner

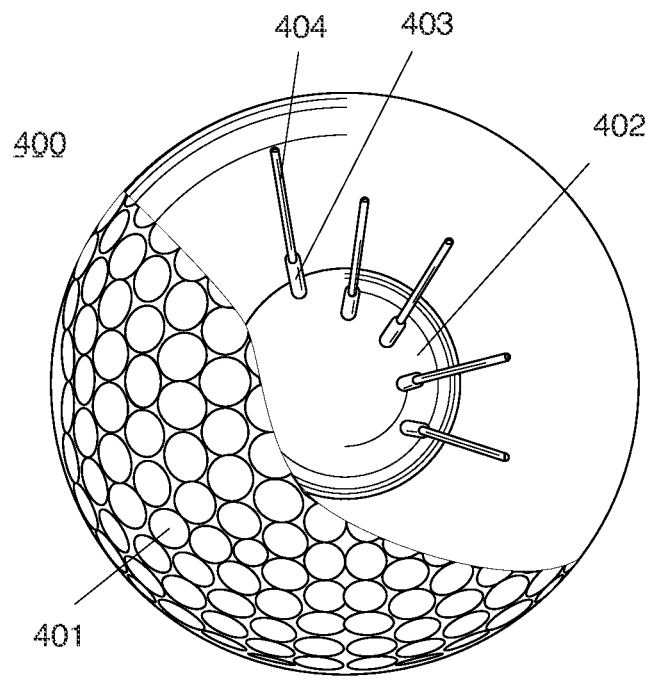
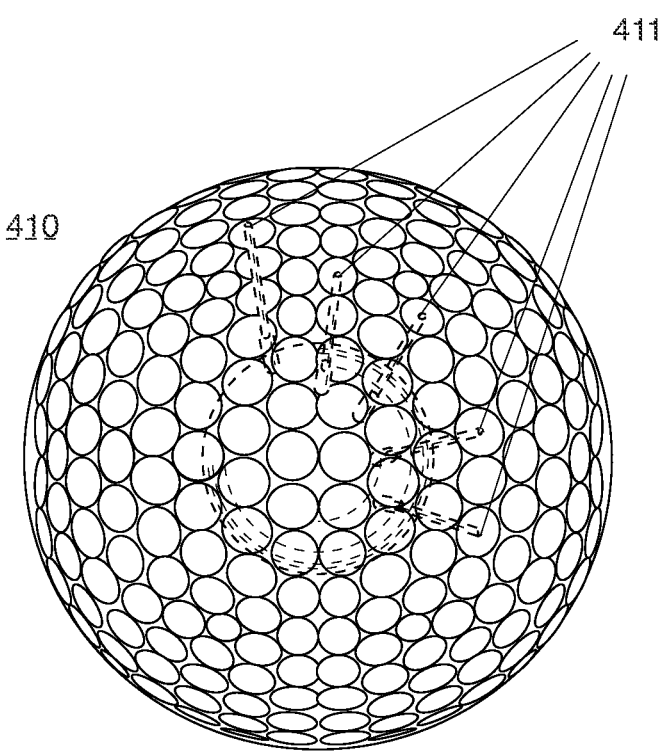
FIG. 4

FIG. 6
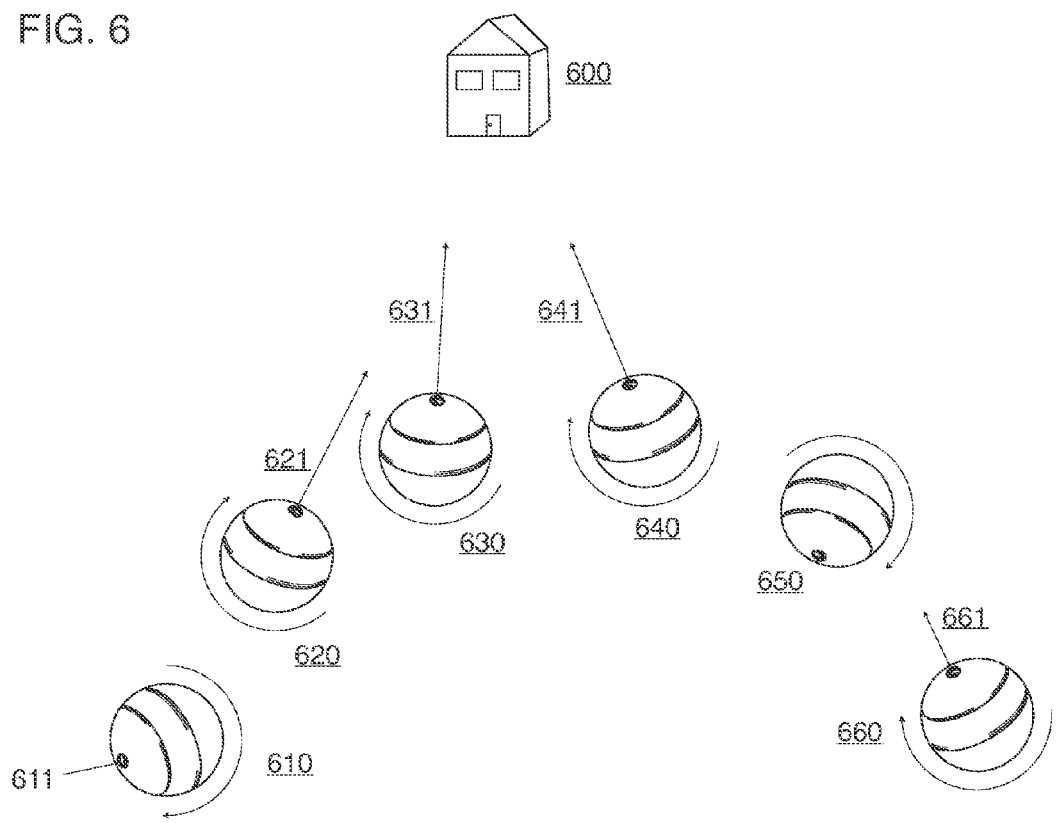
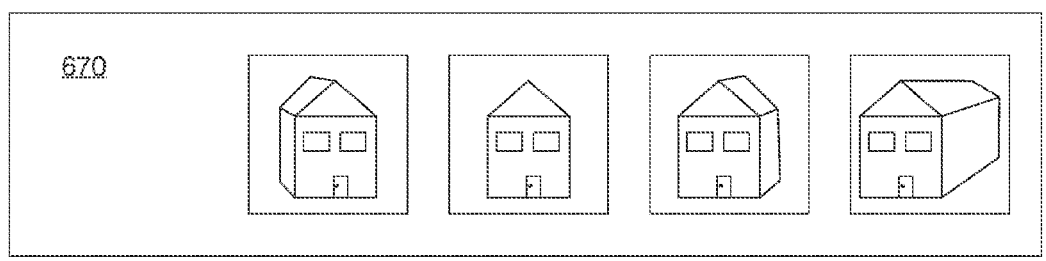
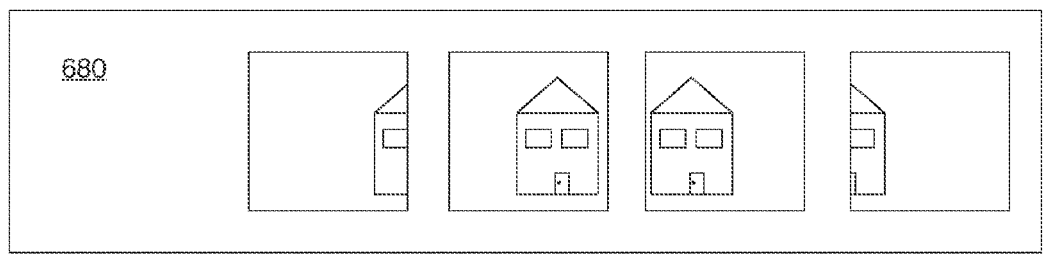

FIG. 7
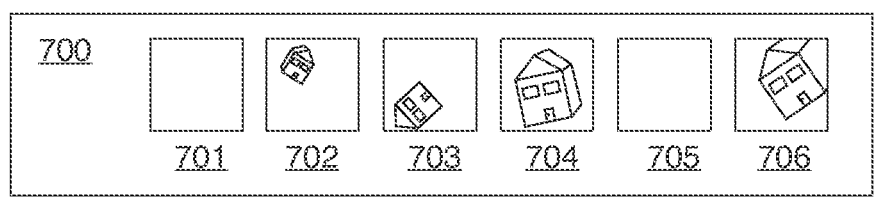
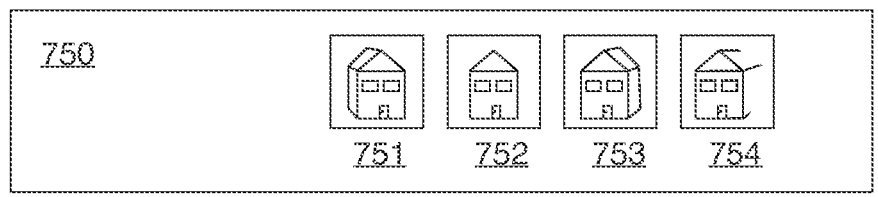

FIG. 8
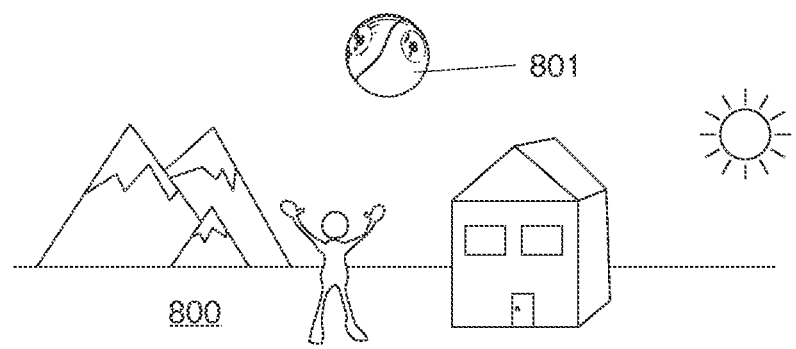
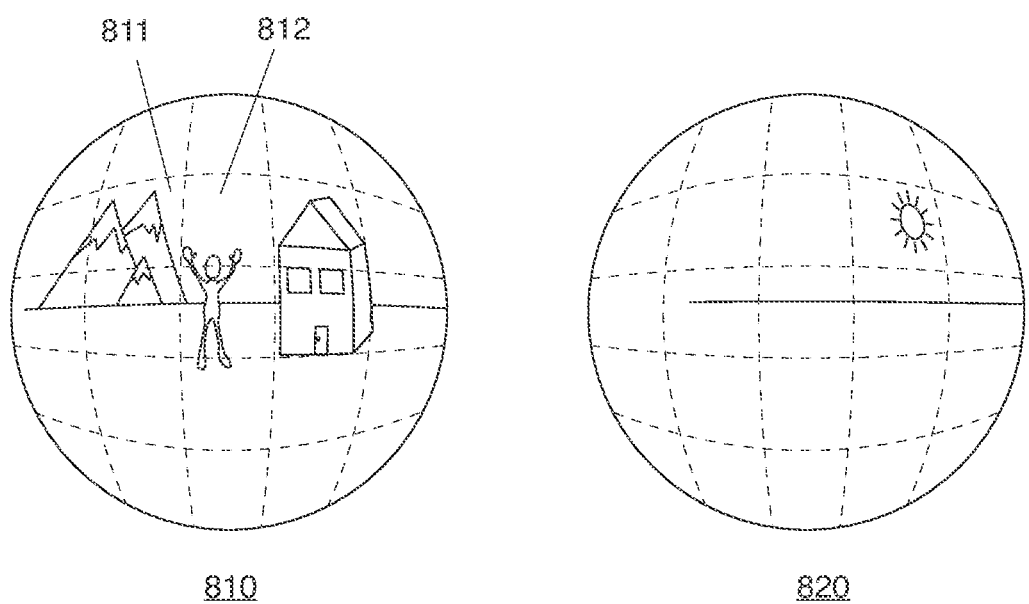

FIG. 9
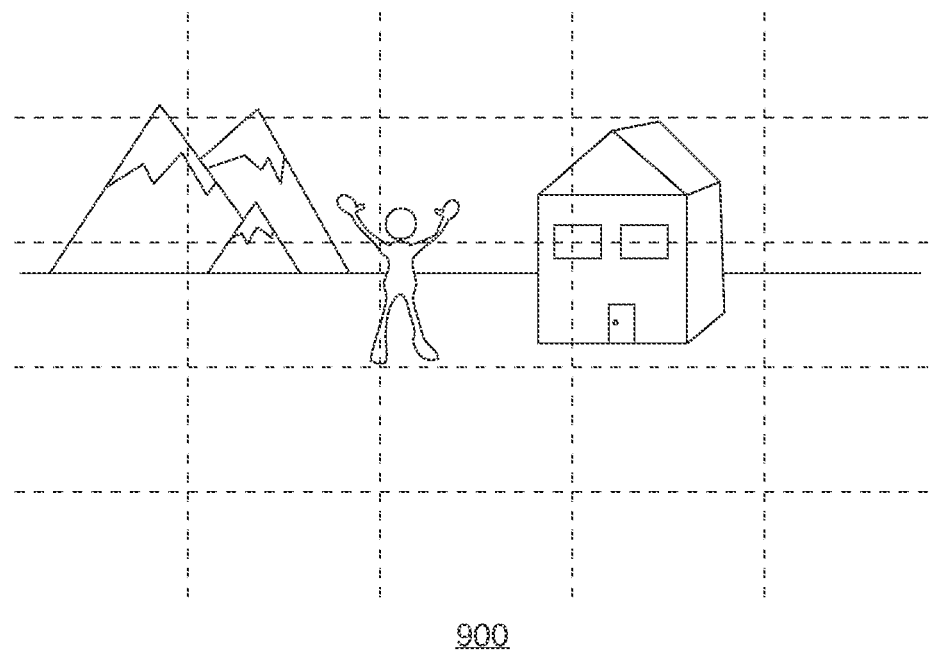
900
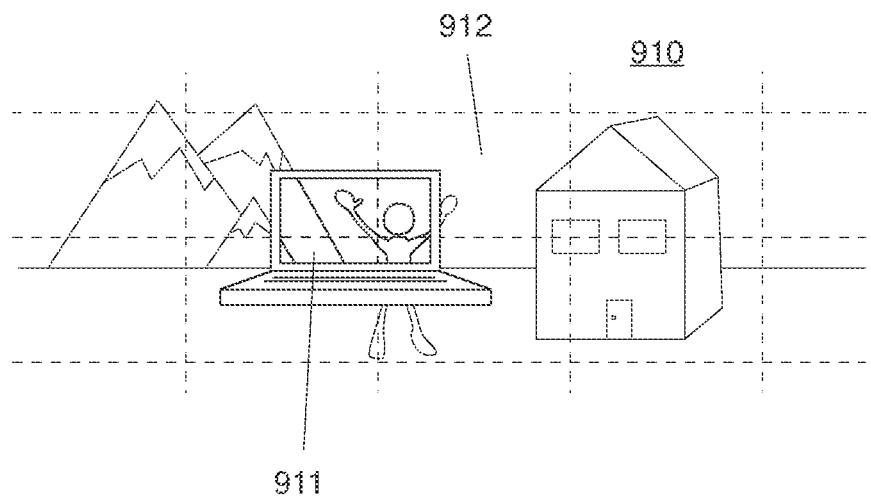
912  910
911

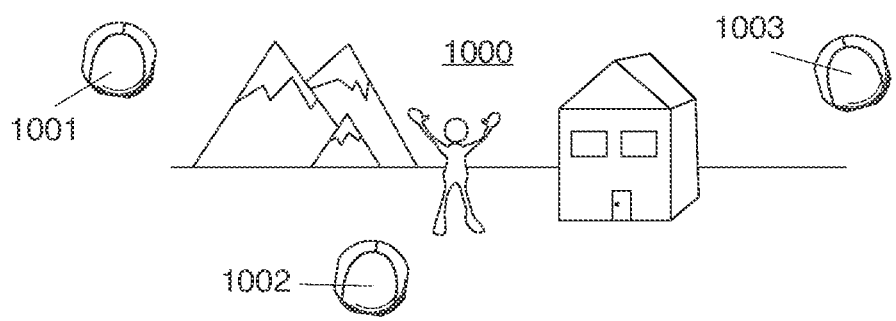
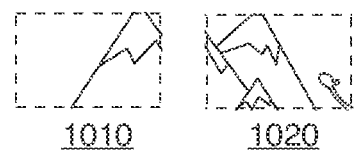
FIG. 10
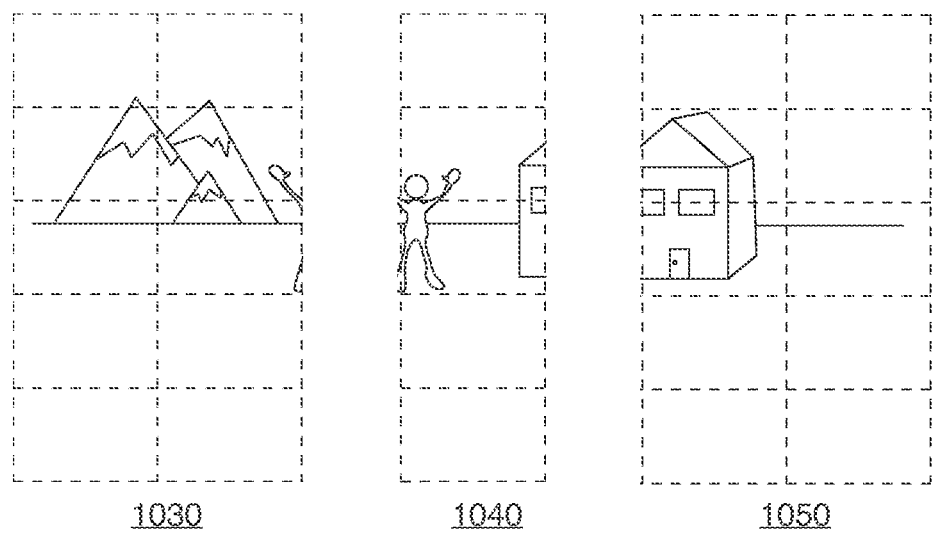

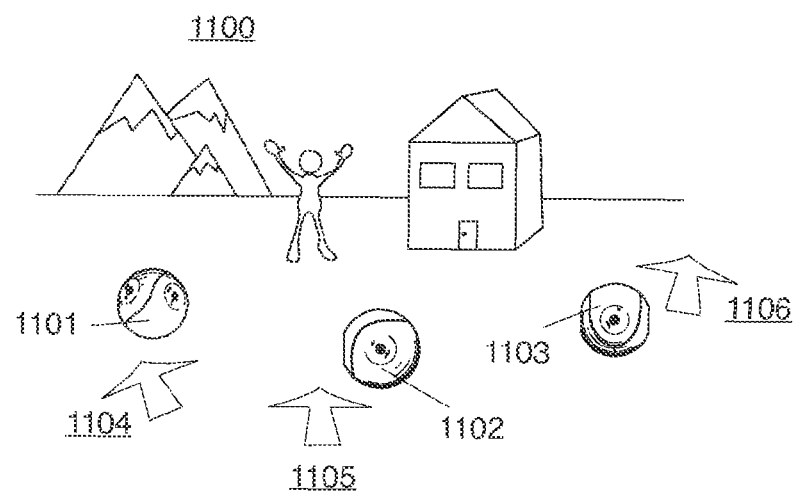
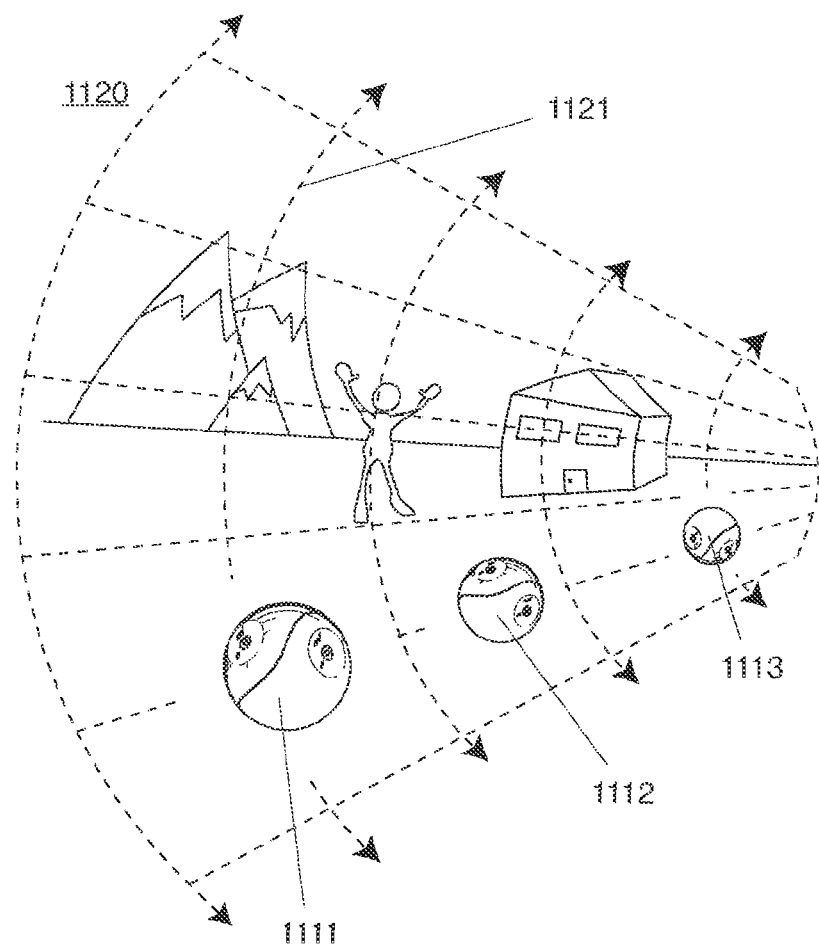
FIG. 11

FIG. 12
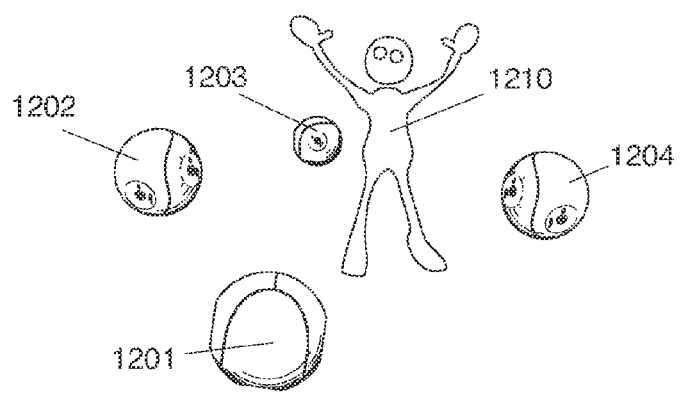
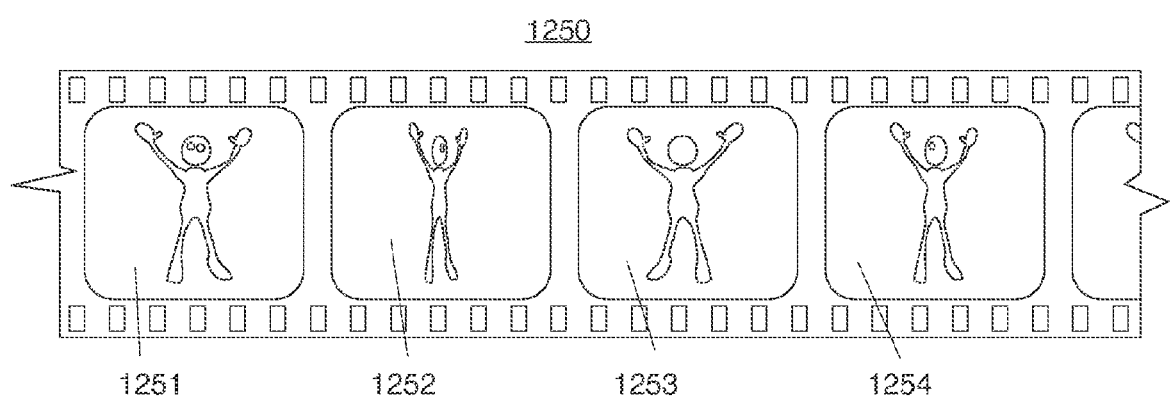

FIG. 17
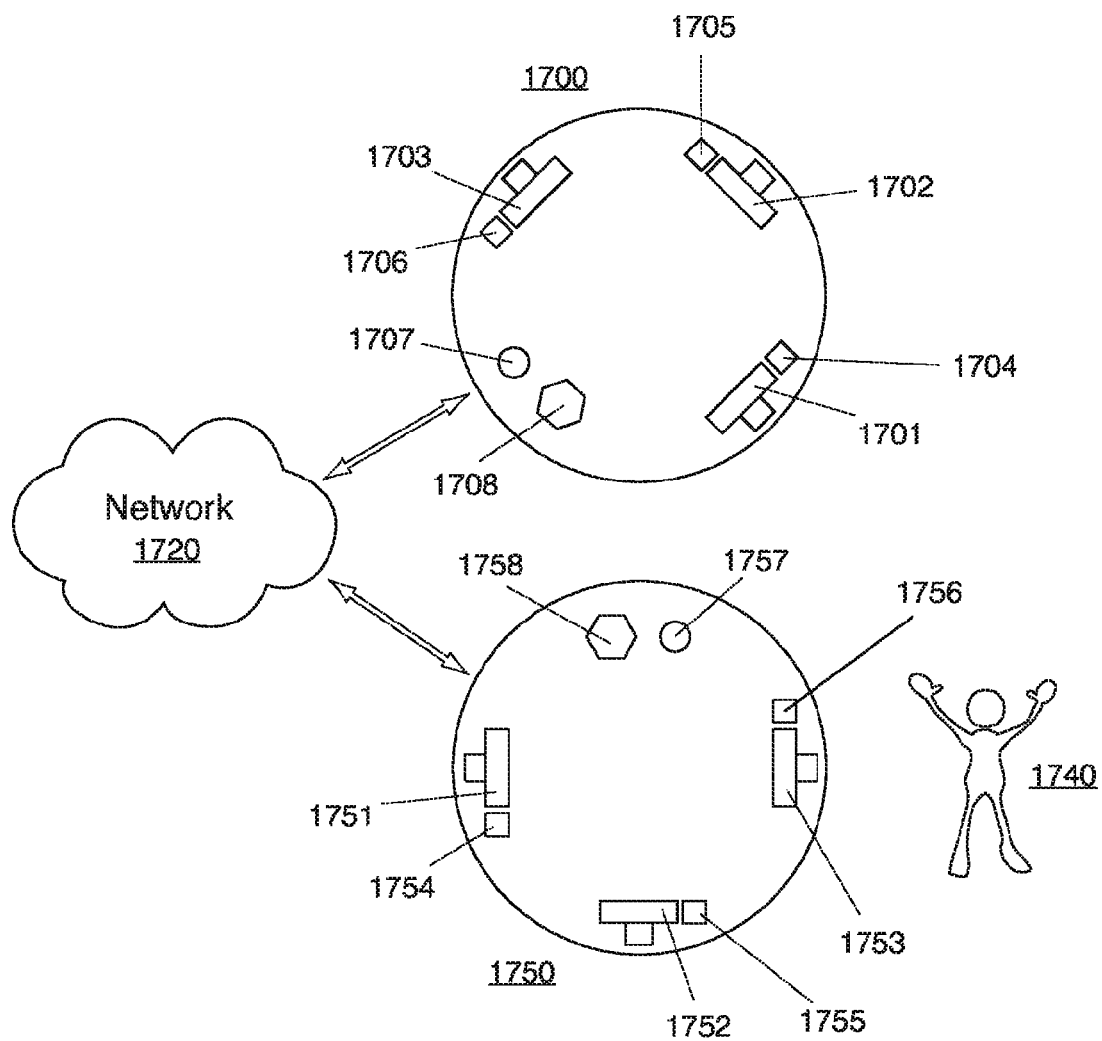
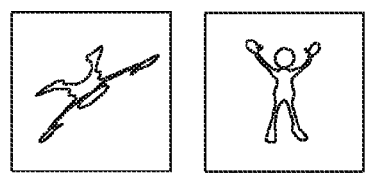

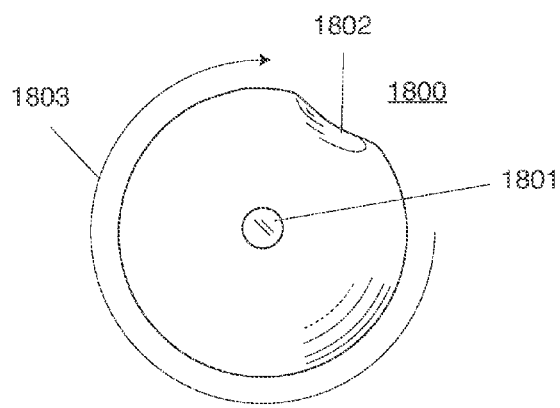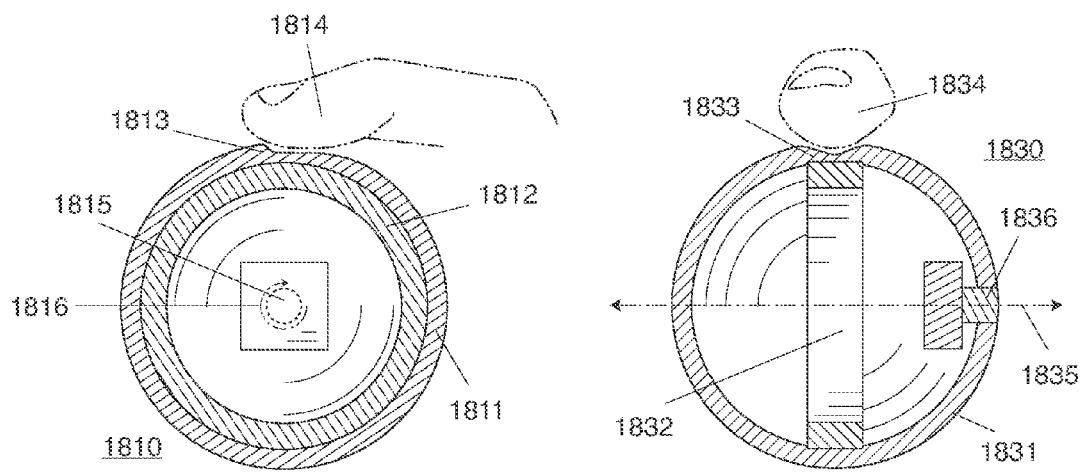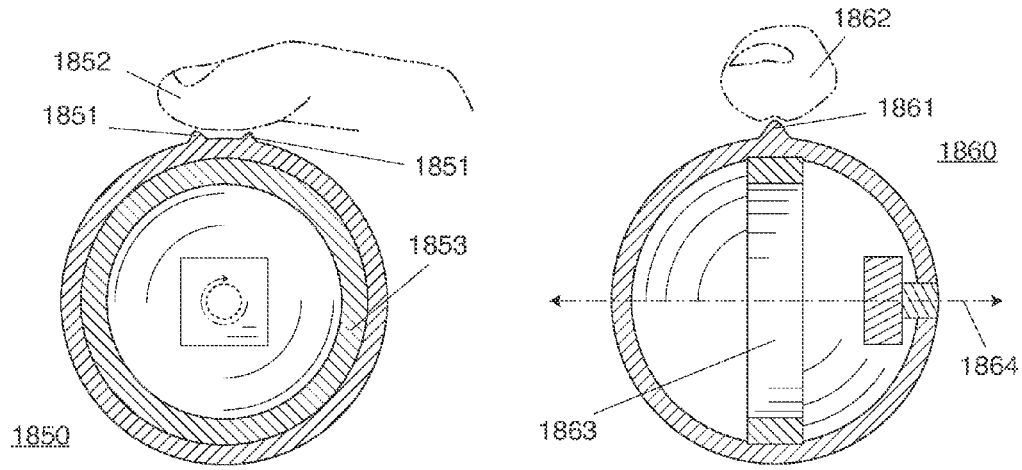
FIG. 18

BALL WITH CAMERA FOR RECONNAISSANCE OR RECREATION AND NETWORK FOR OPERATING THE SAME

CROSS-REFERENCE TO RELATED APPLICATIONS

The present application is a continuation-in-part of U.S. patent application Ser. No. 13/492,616, Ball with camera and trajectory control for reconnaissance or recreation, filed Jun. 8, 2012, which is a continuation of U.S. patent application Ser. No. 12/772,198, now U.S. Pat. No. 8,237,787, Ball with camera and trajectory control for reconnaissance or recreation, filed May 1, 2010, which claims priority from U.S. Provisional Patent Application 61/226,618, Ball with camera and trajectory control for reconnaissance or recreation, filed Jul. 17, 2009, and also, U.S. Provisional Patent Application 61/177,769, Recreational Ball with Trainable Camera, filed May 13, 2009, and also, U.S. Provisional Patent Application 61/174,994, Recreational Ball, filed May 2, 2009. The entire contents of these applications are incorporated herein by reference.

STATEMENT REGARDING FEDERALLY SPONSORED RESEARCH DEVELOPMENT

Not applicable.

BACKGROUND OF THE INVENTION

1. Field of the Invention

The present invention has generally to do with cameras thrown or projected into an airborne trajectory and a system for operating network devices including cameras thrown or projected into a trajectory.

2. Description of Related Art

Projectiles with embedded cameras, including spherical ball-shaped cameras, exist in prior art with suggested uses for military surveillance, reconnaissance and general recreation.

Ball-shaped cameras with a 360-degree view around the circumference of the sphere exist in prior art.

The combination of a camera and a location-sensing unit, both embedded in a projectile, is taught in prior art. Conventional model rockets are equipped with a camera and sensor triggered by a change in the orientation of the rocket body at the apogee of its trajectory.

Great Britain patent GB2444391 teaches of a resilient object, which can be thrown or kicked, to a point of interest, capable of transmitting audio and video information captured by an embedded camera. The description of this resilient object teaches of the use of a GPS sensor and an orientation sensor to provide location information and orientation information, however no description is provided of how these sensors are used for a meaningful capture of image data while the object is airborne. This resilient object is further disadvantaged by its inability to change its own trajectory. The inflatable housing and cubic shape of the preferred embodiment present impractical aerodynamic impediments with respect to drag if a pitched or projected airborne trajectory is desired.

Great Britain patent GB2407725 (A) describes a camera mounted inside a ball. As with the resilient object of patent GB2444391, this ball is disadvantaged by its inability to store and analyze successive frames of captured image data. The ball is further disadvantaged by its inability to capture successive frames of image data captured while spinning or precessing past a ground-based subject in order to produce a meaningful video stream. This ball is further disadvantaged by its inability to change its own trajectory.

Japan patent JP2001042420 describes a camera mounted inside an impact-resistant ball. This patent is disadvantaged by requiring external surface-mounted fins to ensure that the camera provides images from a desirable orientation.

The "Flee" camera conceived by Turkish designer Hakan Bogazpinar at http://www.behance.net/hbogazpinar describes a camera mounted inside a ball that takes pictures at customizable time intervals. This patent is disadvantaged by requiring an external surface-mounted aerodynamic tail to ensure that the camera provides images from a desirable orientation.

The "Satugo" camera conceived by Danish designers Eschel Jacobsen and Mads Ny Larsen at http://www.satugo.com/ describes a camera mounted inside a ball that is triggered on impact with a fixed surface or at preset time intervals.

It is known in prior art, including in above references, that a ball can contain a camera that captures one image or multiple snapshots in the course of its trajectory. It is known in prior art, including in above references, that a ball can contain a camera that captures continuous video in the course of its trajectory. It is known in prior art, including in above references, that a ball can contain a camera that stores images, which can be uploaded for viewing on a computer when the ball is retrieved.

It is known in prior art, including in above references, that a ball can contain a camera with logic for controlling the capture of photographs or video for a preset duration, or based on preset intermittent time intervals over a portion of the course of its trajectory.

It is known in prior art, including in above references, that the camera's orientation relative to its external environment can be stabilized and controlled during flight by aerodynamic means, such as by attachment with a fixed pair of tailfins mounted on the outer housing.

It is known in prior art, including in above references, that a camera moving on an airborne trajectory may be triggered by an external signal from a transmitter.

It is known in prior art, including in above references, that a camera moving on an airborne trajectory may be triggered by a switch that senses impact with a solid object.

It is known in prior art that a camera contained within a housing can operate independent of the orientation of its own exterior housing, using mechanical gyroscopes or digital stabilization techniques. Such methods are employed in ordinary cell phones and digital cameras to remove jitter.

It is known in prior art that fixed perturbations on the exterior surface of a ball can alter the ball's aerodynamic profile. Dimples on a conventional golf ball such as shown in FIG. 1 improve performance by creating a thin unseparated boundary layer of turbulent air between the surface and the high-speed layer.

A golf ball dimple is of a critical size and contour so as to induce the creation of a thin layer of turbulence between the ball's exterior surface and a high-speed layer of moving air, with a goal of producing lift for the longest possible trajectory. A dimple with a fixed depth on a golf ball produces an optimal result for a single aerodynamic condition, and an acceptable sub-optimal result over a range of aerodynamic conditions. Golf ball dimples produce an undesirable drag at lower windspeeds.

Similarly, the rigid ridges on the upper surface of a Frisbee flying disc produce a desirable increase in lift over a significant portion of the disc's airborne trajectory, but produce an undesirable increase in drag at other portions of the disc's trajectory. The ridges are not physically changed in their size, number or shape during flight.

A conventional football is ellipsoid-shaped to eliminate bluff leading and trailing surfaces ordinarily associated with sphere-shaped projectiles, thus improving laminar flow from head to tail.

It is known in prior art that airborne projectiles can contain internal logic and mechanical systems that alter their own trajectories. For example, missiles may contain guidance systems and mechanical gyroscopes to control a flight path. It is known in prior art that airborne projectiles can contain external aerodynamic systems that alter their own trajectories. For example, missiles may contain electromechanical fins to control a flight path.

Recreational balls such as so-called goof-balls contain spring-mounted weights or other simple mechanisms to shift the center of lift while in flight, creating either a spiraling or a randomly shifting trajectory. Such balls are disadvantaged by an inability to purposefully control their trajectory.

A network camera is a device for transmitting a captured image to a client device in a wired or wireless manner. The network camera converts a captured image from analog to digital, encodes the digitally converted image, and transmits the encoded image via wired or wireless network. Network cameras are broadly used to capture images in a security system using closed circuit television (CCTV).

Simultaneous localization and mapping (SLAM) software and hardware is used by robots and autonomous vehicles to build up a map within an unknown environment (without a priori knowledge), or to update a map within a known environment (with a priori knowledge from a given map), while at the same time keeping track of their current location.

Projectile cameras of prior art are limited in their ability to generate images acquired in all directions from a single viewpoint, at one moment in time. Such a limitation makes difficult, for example, the capture of a spherical panoramic video from a central point of view surrounded in all directions by moving objects.

Cameras of prior art, including examples of camera networks, are further disadvantaged by cumbersome camera housings, complex mechanics necessary for locomotion or flight, and costly guidance technology necessary for self-sustained flight.

U.S. Pat. No. 7,680,192 describes a multi-sensor panoramic network camera.

U.S. Pat. No. 8,373,755 describes a network camera and system and method for operating the network camera and system.

BRIEF SUMMARY OF THE INVENTION

The object of the invention is achieved by a hand-held ball that, when thrown or projected into an airborne trajectory, senses its position and orientation to trigger an embedded camera with the purpose of capturing an image of a ground-based target subject, spatially transforms the captured image to a normal relative to the ground-plane, and provides the image to the ball's user.

In another aspect of the invention, the ball compiles multiple captured images into a video flyby of the ground-based target subject.

In another aspect of the invention, the ball's on-board processor stitches multiple images captured at a moment in the trajectory into a single panoramic view.

In another aspect of the invention, the ball's on-board processor compiles multiple panoramic views into a viewable fly-through of the environment through which the ball traveled.

In another aspect of the invention, the ball contains a sensor to detect when the ball is both at its apogee and in an earth-facing orientation such that the camera is capable of capturing an image of the ground-based target subject.

In other aspects of the invention, images captured in flight are stored in memory available in real-time to the ball's on-board processing unit, allowing the logic unit to apply knowledge gained from prior image captures to decisions regarding the triggering of successive image captures and trajectory changes.

In still other aspects of the invention, the ball's embedded camera is instructed by the ball's on-board logic unit to vary capture resolution, providing low-resolution images for internal real-time analysis in order to determine the appropriate moments in the ball's trajectory to capture high-resolution image information.

In a further aspect of the invention, the ball contains a range-finding sensor capable of triggering the capture of image data at a preset distance from a target or point of impact.

In another aspect of the invention, the ball is capable of mechanically opening an aperture to its camera lens for image capture operations when the ball is safely in flight, and retracting the lens and protecting the camera from shock prior to an impact.

In a further aspect, the object of the invention is achieved by a ball that uses orientation and location information collected by embedded sensors to actuate an embedded trajectory-changing mechanism capable of modifying the exterior surface of the ball in order to stabilize the ball and move toward a point of interest. The mechanism may act in counter-revolution with the ball's rotation in order to create an aerodynamic condition at a virtual location relative to the ball's exterior environment independent of the actual spiraling or spinning exterior surface.

In a further aspect, the object of the invention is achieved by a ball that uses orientation and location information collected by embedded sensors to actuate an embedded trajectory-changing mechanism capable of shifting the center of mass of the ball in order to stabilize the ball and move toward a point of interest. The mechanism may act in counter-revolution with the ball's rotation in order to create an aerodynamic condition at a virtual location relative to the ball's exterior environment independent of the actual spiraling or spinning exterior surface.

In still another aspect of the invention, the ball's embedded camera has a single aperture for image capture connected to a unified end of a fused fiber optic bundle; and the fiber optic bundle providing the lens with a multitude of distinctly separate images as the bundle branches out to a series of independent fused fiber optic image capture points at the exterior surface of the ball; and the ball's onboard processing unit capable of matching each discrete image in the matrix to its respective location on the ball's surface for the purpose of including or excluding images derived from a particular orientation.

In another aspect of the invention, the ball's embedded processing unit is capable of producing a contiguous video by creating a compilation of discrete frames captured from a single desired perspective available at discrete moments while the ball spirals through its trajectory, and otherwise ignores images available during the flight. The processing unit may sieve from a raw set of captured images in memory to create a compilation containing the target subject or the processing unit may trigger the camera to capture only those images that are useful in creating a compilation containing the target subject.

In another aspect of the invention, an image of the ground-based target subject is transmitted wirelessly from the ball to its ground-based user.

In another aspect of the invention, the ground-based user transmits the location of the ground-based target subject to a receiver on the ball, and the ball's on-board camera subsequently captures an image of the target.

In other aspects of the invention, the ball derives its location information from an embedded impact sensor and processing unit that uses data regarding the time of multiple impacts along a series of bounces to predict subsequent points in its path, and uses this information to trigger image capture at each successive apogee.

In other aspects of the invention, the ball contains a camera with a distance-calibrated focus and an onboard processing unit that analyzes the frequency of a series of successive image captures to determine the ball's distance from a subject.

In other aspects of the invention, the ball's embedded camera may be trained to capture images of a desired subject along its trajectory by the transmission of location information to the ball prior to the ball's flight. The data provided to the ball prior to its flight may be provided by the transmission of location information by a training unit.

In other aspects of the invention, the training unit itself may be a second ball, capable of being thrown over a desired subject and transmitting location information to the ball containing the embedded camera, with the result being the capture of a series of images taken by the ball with the embedded camera where the images are exclusively those of the subject at the location past which the training unit passed during its flight.

In other aspects of the invention, the ball containing the embedded camera senses the starting location of its trajectory and subsequently, after being thrown, exclusively captures an image of the ground-based subject at the original location.

In still other aspects, the ball is weighted to produce a gyroscopic force significant enough to maintain a repeatable spinning or precessing orbit of the camera's viewpoint around the ball's center of gravity.

In still other aspects, an imaging system includes a plurality of throwable camera balls for capturing and transmitting images over a network to a common processor; the processor stitching the captured images into a generally seamless image.

In still other aspects, an imaging system includes a plurality of throwable camera balls for capturing and transmitting images over a network to a common processor; the processor compiling the images into an animated video sequence.

In other aspects, the ball camera of this invention selects captured images for further processing in response to a signal from a sensor on the camera.

In another aspect, the physical location and configuration of at least one aperture of the camera of this invention is transmitted to a network device.

In another aspect, the camera ball of this invention triggers an image capture in response to a sensor such as a motion sensor, atmospheric sensor or image recognition sensor.

In an aspect of this invention, the camera ball captures images are tagged with information from sensors, the images and sensor data tag.

In another aspect of the invention, a client device on an image capture network runs image processing and acquisition software configured to generate a panoramic image by performing image "stitching", where the "stitching" is designed to eliminate image overlaps and to assemble a larger seamless image from images taken by multiple throwable cameras on the network.

In another aspect, a master throwable camera sends an instruction to a slave throwable camera.

In another aspect, an animated moving picture sequence from image data captured by at least one throwable camera, the sequence of frames determined in response to a signal from a position sensor.

In another aspect, a deformation on the camera ball housing, such as an indentation, aligns a user's finger relative to the axis of rotation for the purpose of introducing gyroscopic stability, and for providing the user's finger with a mechanical advantage accelerating the ball into its trajectory.

In another aspect, at least one camera aperture is centered on the axis of rotation, perpendicular to the axis of rotation, and an indentation or perturbation aligns the user's finger to accelerate the camera into a spin around the axis of rotation.

In another aspect, two cameras apertures are located on either side of a ball camera housing, centered on the axis of rotation, perpendicular to the axis of rotation.

In another aspect, two camera apertures are located on either side of a ball camera housing, centered on the axis of rotation, perpendicular to the axis of rotation, and at least one additional camera is located on a plane perpendicular to the axis of rotation.

BRIEF DESCRIPTION OF THE SEVERAL VIEWS OF THE DRAWINGS

FIG. 4 shows an interior view and an exterior view of an example golf ball of this invention, with small perturbations extending outwardly from the center of a few dimples in order to change the ball's airborne trajectory; FIG. 6 illustrates how the ball of this invention is capable of capturing images of a desired subject while spinning over the arc of an airborne trajectory and also shows two varying examples of image frames compiled into a video; and FIG. 7 illustrates how raw image data available to the camera of this invention may be selected, scaled, rotated and offset to produce a sequence of normalized images of a target subject.

FIG. 8 illustrates how the camera of this invention produces a full spherical panoramic image.

FIG. 9 illustrates how a full spherical panoramic image is presented for access by a network client device.

FIG. 10 illustrates the operation of multiple network camera balls to produce a single panoramic image.

FIG. 11 shows an example image stitching geometry generated by multiple network camera balls moving along independent trajectories.

FIG. 12 illustrates the capture of images from multiple network camera balls and the production of a moving picture from still images.

FIG. 17 is an illustration of the image capture system of this invention using an event sensor on the network to trigger an image capture.

FIG. 18 is an illustration of weighted camera balls having a physical deformation to align a user's finger with the axis of rotation.

DETAILED DESCRIPTION OF THE INVENTION

A ball capable of isolating image capture to a desired subject or perspective and further capable of changing its trajectory in order to improve the capture of video or still images is made possible by the advent of shock-resistant microelectronic GPS sensing packages, gyroscopes and multi-axis accelerometers and the availability of inexpensive high-capacity storage and low-light, high-speed image capture electronics.

Because the ball of this invention describes the capture of images from the viewpoint of a smooth arc, a video produced by the ball is substantially improved by comparison with conventional means for moving a camera. A movie captured by the ball of this invention would also be easier and faster to produce than one that required the installation of a dolly, a steadicam, a kite, or other unwieldy configuration. Lastly, a movie captured by the ball of this invention would represent a view of environments unavailable to conventional cranes, helicopters or surveillance equipment.

Figure 1:
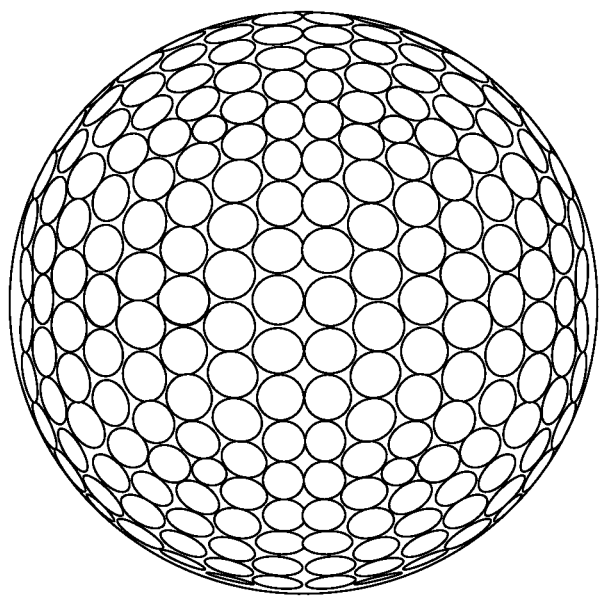
FIG. 1 shows an exterior view of a golf ball of prior art.
Figure 2:
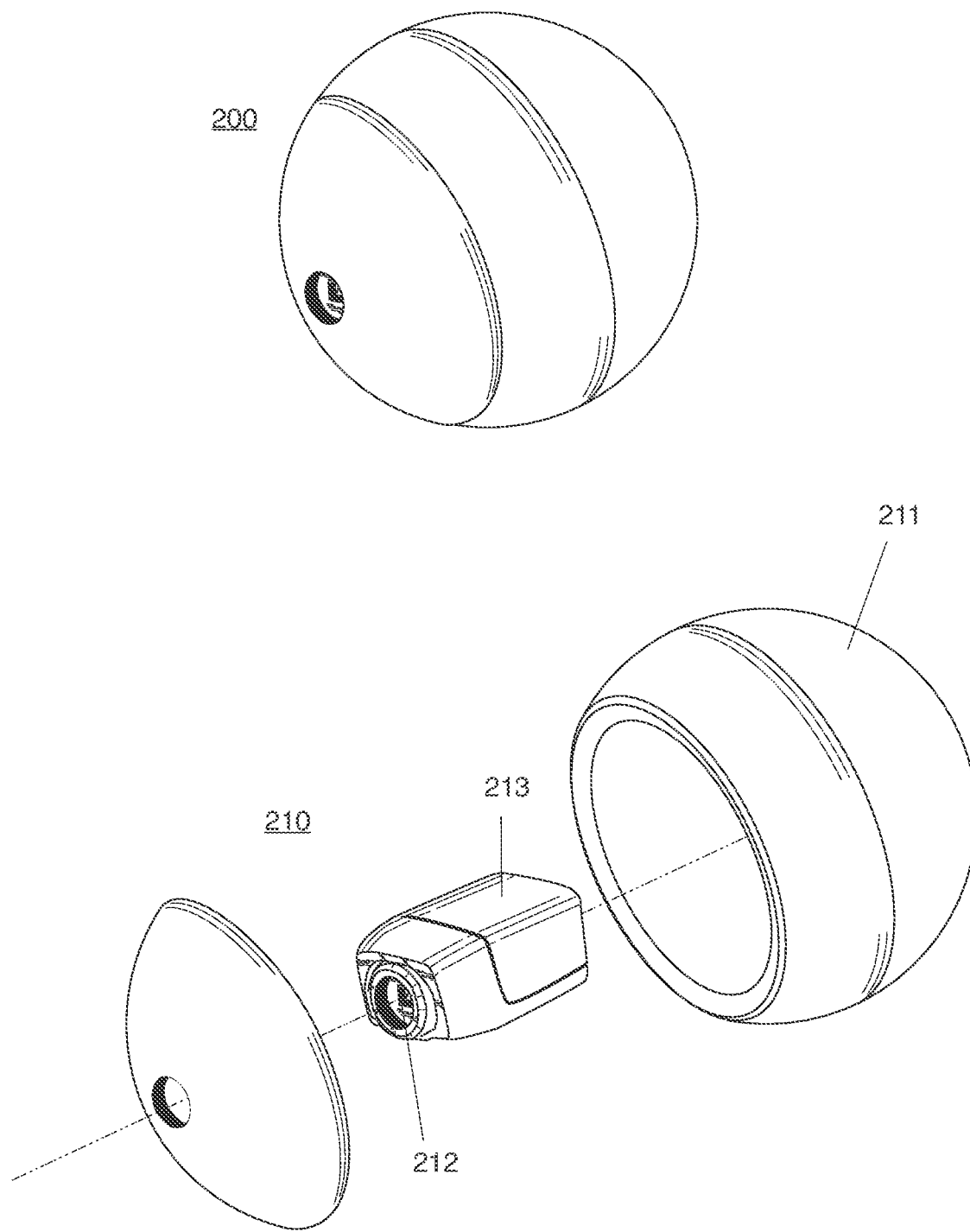
FIG. 2 shows an embodiment of the ball of this invention in an assembled and an assembly view.

One embodiment of the ball of this invention is shown at 200 in FIG. 2 and in a assembly view at 210. Resilient housing 211 contains camera 212, and a microelectronic package within housing 213 comprising an orientation detector, a GPS sensor, image storage memory, a transmitter and a processing unit. The processing unit monitors the orientation detector and triggers the camera to store an image when the camera is facing a predetermined ground-based target subject and to rotate the captured image to a fixed normal such as the earth's horizon. The GPS sensor enables the processing unit to trigger the images of the ground-based target subject from a desirable perspective and also for determining optimal moments for image capture over the course of the ball's airborne trajectory. The collection of stored images representing the desired subject are compiled by the processing unit into a smooth fly-by video and transmitted to the ball's ground-based user.

Image Capture Over a Spiraling Trajectory

In one embodiment of the ball of this invention, a processing unit within the ball creates a smooth, linear and continuous moving picture video of a target subject produced while the embedded camera's aperture is spinning or spiraling around the ball's center of gravity and is moving through the arc of the ball's trajectory. The objective of this embodiment is to create a video that represents a camera's view of the ground-based target subject from the perspective of a single point moving along the ball's trajectory, with no apparent spinning or spiraling field of view.

Such an embodiment is made possible by the fact that a solid-state camera can be thrown or projected into a spin within a pitched ball so that it is viewing the same field of view at a frame rate approaching or exceeding an optimal video frame rate of approximately $1/30^{th}$ of a second.

Such an embodiment of the ball of this invention is capable of capturing and normalizing a smooth sequence of image frames in order to produce a sequence of video image frames as illustrated at FIG. 6. As shown, the ball has been thrown into a trajectory, and is spinning in an arced trajectory past a distant house. The state of the ball is shown at six separate successive moments in its trajectory, with the first at 610 and the second at 620, then 630, 640, 650 and the last instant at 660. The house past which the ball is traveling is shown at 600. An arrow next to each instance of the ball indicates the direction of spin. Camera 611 in the ball at 610 is not oriented in the direction of the house so the ball's processing unit does not signal the camera to capture an image when it is in this state. The camera in the ball at 620 is facing the general direction of the house as shown by arrow 621, so the processing unit signals the camera to capture an image. Similarly, when the ball arrives at the positions shown at 630, 640 and 660, its camera is facing the house as shown by respective arrows 631, 641 and 661.

The four images captured by the camera inside the ball when it is in positions 620, 630, 640 and 660 are shown in two possible examples at 670 and 680. As exemplary of the embodiment of the ball of this invention at 670, the camera has captured four perspective views while remaining generally fixed on the subject of image capture, namely the house, and the processing unit has further rotated each capture to the normalized orientation of the ground-plane. At 680, the camera instead has captured a scanning view of the house, and the processing unit has further rotated each capture to the normalized orientation of the ground-plane. Both types of capture are possible because the ball is spinning fast enough to provide views of the passing house. The orientation sensor in the ball has a dual purpose, one being to provide the processing unit with the orientation of the ball for the purpose of locating the target subject of image capture, and the second being to provide the processing unit with the orientation of the ball relative to the ground-plane so a series of successive captures can be normalized to a single plane.

In the embodiment of the ball of this invention as illustrated in FIG. 6, the selection of discrete frames for production of a smooth continuous video occurs as the processing unit signals capture of discrete images at select moments in time, only when the house is in the field of view, for example, and compiles these select frames into a moving-picture video.

In an alternate embodiment, the processing unit selects a target image from a plurality of images tagged with their respective orientation and position information at the time of capture. The processing unit may thereby cull a meaningful subset of images by examining the stored set of images and respective tags to select a series of images of the target subject of image capture; and then normalize each image to a predetermined plane and compile the images into a moving-picture video. This embodiment enables the camera to capture image data independent of the processing unit, allowing the processing unit time analyze, normalize and transmit images at a slower rate than the capture rate.

Because the selection of images representing the ground-based target of image capture may either occur in real time wherein the camera is triggered at appropriate moments based on the ball's position and orientation, or may occur in a process of winnowing selections from a plurality of captured images stored with their respective orientation and position tag, it is anticipated that a number of innovations described herein may be applied to either image selection method.

As shown in FIG. 7, the normalization of images captured may require 2-dimensional and 3-dimensional transformations by the sphere's processing unit. Example captured data of the camera trajectory of FIG. 6 is shown in raw form at 700, and in a normalized sequence of frames at 750. Blank image frames 701 and 705 are representative of the camera's viewpoint when the ball is at positions 610 and 650 in FIG. 6. The raw image captured at position 620 in FIG. 6 appears at 702 in FIG. 7. Similarly, images captured at positions 630, 640 and 660 in FIG. 6 appear in raw form at 703, 704 and 706 in FIG. 7.

The processing unit of this example normalizes images as shown at 750 in FIG. 7. The images available to the camera at positions 610 and 650 in FIG. 6 have been excluded by the processing unit because the processing unit was aware that the camera was not in a suitable disposition at those points in the ball's trajectory. Images 702 and 703 required a rotation, offset and scale operation to produce normalized images as seen respectively at 751 and 752. Image 704 required a rotation and an offset to produce a normalized version at 753. Raw image 706 was partially out of the camera's viewpoint, so the normalization process included only the available portion, normalizing the image by rotating and offsetting the raw image to produce an acceptable frame at 754.

Normalization to rotate a captured image to a predetermined plane such as a ground-plane is possible if the sphere includes an orientation sensor. Normalization to scale is possible using a variety of techniques. For example, the sphere may have a distance-sensing unit such as a conventional auto-focus mechanism; or an embedded position sensor and knowledge of the ground-based subject's absolute location; or image processing means to recognize the target in the capture image regardless of its size.

It is anticipated that missing image data such as the cropped rear of the house at 754, normalized from raw data at 706, may be restored using data from prior and subsequent captures.

In another embodiment of the ball of this invention, the camera is mounted on a motor shaft within the ball and spun at high speed, independent of the ball's exterior housing, so that when the ball is thrown past a subject the camera aperture is rotating at such high speed it is in position to face the subject for a quick still image capture at least 1/30 times per second and potentially at much higher rates. The resulting set of captured still image frames can be combined and shown at a frame rate of 1/30$^{th}$ of a second to produce a smooth video, as if the aperture were panning continuously along the subject. It is anticipated in this embodiment that the motor speed must compensate for the ball's own rotation and that such an adjustment is possible because the ball's rotation and in-flight data is available from the ball's processing unit.

In another embodiment of the ball of this invention, the camera is mounted on a motor shaft, independent of the ball's exterior housing, so that when the ball is thrown past a subject, the camera aperture is constantly rotated within the ball to face the subject. It is anticipated in this embodiment that the motor speed must counter the ball's own rotation and that such an adjustment is possible because the ball's rotation and in-flight data is available from the ball's processing unit.

It is anticipated that the above embodiments that require a moving camera within a ball are also possible by a fixed camera with a moving aperture; or by a fixed camera and moving mirrors; or a fixed camera with a multitude of apertures; or a fixed camera with a multitude of fused fiber optic image bundles; or any other means for capturing a sequence of images that correspond to particular locations along the ball's trajectory.

Trajectory Trigger

A ball may be designed so its image capture capabilities and mechanical trajectory-changing capabilities are triggered by a processing unit which is aware of the ball's location in space during the course of its trajectory, as well as its orientation in revolution.

In the present context, a trajectory trigger is a mechanical or electronic processing unit contained within the ball of this invention, capable of sensing the ball's in-flight position and, based on information derived from the sensed information, is capable of triggering an action, for example an image capture or a trajectory-changing mechanism.

At minimum, a trajectory trigger has at least a single sensor and a logic unit capable of signaling an action based on the state of the sensor.

Sensors employed by a trajectory trigger may, as examples, detect the ball's absolute location relative to Earth using GPS data; or sense relative velocity or acceleration using accelerometers; or sense altitude using an altimeter; or sense rotational velocity using a gyroscope; or provide information describing the time between impacts derived from a motion sensor and a clock; or recognize spatial relationships of external objects using an on-board camera. Combinations of multiple sensors and processors may further be of benefit to a trajectory trigger, for example a timing chip combined with an altimeter to provide data for predicting the arrival of the ball at its apogee.

In practice, the action initiated by a trajectory trigger may be to signal the photographic capture of an image at a precise moment in the ball's trajectory; or to actuate a mechanical device which causes a desired change in trajectory; or both actions to stabilize the ball; or both actions to redirect the ball for the purpose of capturing images of a desired subject.

The ball of this invention may contain a plurality of trajectory triggers to control image capture, camera stability and trajectory guidance events. For this reason, the trajectory trigger is described as a separate logic unit from the camera or other on-board unit that is triggering. It is anticipated that the trajectory trigger and a camera may be combined within the ball as a single package, however in the present context they are discussed separately.

The trajectory trigger may employ a variety of sensors in order to determine the appropriate moment to trigger an event within the ball. An altimeter and accelerometers may be used to detect when the ball is both at its apogee and oriented such that the desired subject is in the field of view of an embedded camera.

The trajectory trigger may use a motion sensor to detect the ball's initial pitch, and a timer to store the time length of the ball's trajectory, and an impact sensor to sense a bounce, and the combination thereof used to predict the point at which the ball reaches its apogee between successive bounces.

The trajectory trigger may use a motion sensor to detect the ball's initial pitch to initialize operations required during the ball's airborne trajectory.

The trajectory trigger may use an impact sensor to initiate shutdown operations, in order to conserve energy.

The trajectory trigger may use an accelerometer to determine the ball's position relative to its initial position when initially pitched, as well as its orientation, velocity, rotation and/or acceleration while in flight.

The trajectory trigger may use a Global Positioning System (GPS) sensor to determine its own absolute position relative to the Earth, as well as point-to-point information to calculate velocity, acceleration and other in-flight information.

The trajectory trigger may uses an antenna to detect and triangulate asynchronous energy waves, such as cell-phone microwaves or radio frequency waves, to determine the ball's relative or absolute position, orientation, velocity and/or acceleration.

The trajectory trigger may use its own transmitter and receiver to send and receive energy waves, such as infrared or radio frequency waves, to determine the ball's position, orientation, velocity and/or acceleration by bouncing the waves off an external object and receiving a reflected wave.

The trajectory trigger may receive information transmitted from a ground-based unit that transmits the ball's position, orientation, velocity and/or acceleration. The trajectory trigger may request such information from a ground-based unit, or may passively receive such information.

The trajectory trigger may have direct access to read on-board memory containing an image captured by the ball's on-board camera, analyzing the captured image and using the results of image analysis in subsequent logic operations to determine when to capture a particularly desired image. The resolution of the images captured for analysis may be lower than the images captured for reconnaissance, and may be deleted by the trajectory trigger once processed.

The trajectory trigger may analyze one or more captured images to determine the ball's position, orientation or distance relative to a subject in the camera's field of view.

The trajectory trigger may compare successive frames of images captured by the camera to determine the ball's current velocity or acceleration by comparing the movement of spatial information across the camera's field of view, or by comparing the change in frequency of the images as focus increases or decreases.

The trajectory trigger may trigger the camera based on its own pattern matching or feature recognition on of one or more prior captured images. For example, the trajectory trigger can signal the camera to capture a high-resolution photograph when it detects a human face during its analysis of a series of prior low-resolution image captures. As another example, the trajectory trigger can signal the camera to capture a high-resolution image when it detects the contrast between the earth and the earth's horizon during the analysis of a series of low-resolution captures.

The trajectory trigger may trigger the camera at a preset point in its range-finding capabilities, for example whenever the ball is exactly five feet away from a baseball batter, or whenever the ball is exactly ten feet away from the ground as it bounces down a street.

The trajectory trigger may trigger the camera at absolute points or distance intervals in its trajectory, for example at preset GPS coordinates.

The trajectory trigger may trigger the camera at fixed measurement intervals in its trajectory, for example at preset GPS distances.

The trajectory trigger may trigger the camera at points in the ball's trajectory based on logic that allows the ball to learn about its environment, and determine what images are uniquely important. For example, the ball can detect and identify repeating textures such as pavement below and sky above, thereby understanding its relationship to the earth and also allowing it to isolate foreground images from the background environment.

In an inexpensive embodiment of the invention, the trajectory trigger may uses analog photocells or photodiodes to determine the ball's orientation relative to the sky.

In an inexpensive embodiment of the invention, the trajectory trigger may use a gravity-sensing switch such as a mercury switch to signal the camera when it senses that the camera lens is approximately aligned in a downward orientation.

In another embodiment of the invention, the ball contains a liquid that substantially surrounds and contains the camera, to provide stabilization as the ball is thrown or projected.

The ball may contains an inner ball which itself contains the electrical and mechanical components, and the inner ball is substantially isolated from the outer ball by a friction-minimizing liquid which allows the inner ball to rotate freely in order to maintain a particular orientation different than that of the ball's exterior housing.

In another embodiment of the invention, an magnetic Ferro fluid exists in a layer between the ball's exterior housing and a separate, independent inner ball, and controlled from within the inner ball such that, when magnetically activated, provides a means to lock the inner ball to a fixed position relative to the exterior housing of the ball, and when not electromagnetically activated, frees the inner ball so it can rotate freely from the exterior housing.

An electric solenoid, electric motor or galvanometer may be used to control the position of the camera within the ball.

A gyroscope may be used to maintain the camera's orientation independent of the exterior housing of the ball.

The ball may be weighted to create a gyroscopic force in order to stabilize the camera or to create a repeatable orbit of the camera as it spins or precesses around the ball's center of gravity. Such a weight may create an axis around which the camera spins, with the viewpoint of the camera aligned with the axis. Images taken by the camera in alignment with an axis of spin could be rotated by the trajectory trigger using an orientation sensor to normalize the images to a single orientation.

An electric galvanometer may be used to control the position a mirror within the ball, with the mirror's reflection reflecting the subject image toward the camera lens, the primary advantage of the galvanometer/mirror combination being its rapid response to changes in the ball's behavior.

The trajectory trigger may share the ball's position, acceleration and velocity information with the camera's internal stabilization electronics to improve performance before the trajectory trigger subsequently signals the camera to capture and store a desired image.

It is anticipated that the ball may contains multiple cameras at various orientations.

It is anticipated that the camera may capture discrete still images or continuous video images.

It is anticipated that the ball may contains means for capturing a 360-degree panorama of its exterior environment. Means for creating a panorama may be provided by a single-360-degree image capture camera, by multiple cameras, or by stitching multiple captured images, each of a portion of the scene, into a single panoramic image. An orientation sensor within the ball is used to normalize captured panoramic views to a single orientation such as a fixed horizon line. Multiple panoramic views may be compiled in succession to create a three-dimensional walkthrough of the environment through which the ball passes. Three-dimensional panoramic data can be flattened to produce a two-dimensional video of a pass-through of the ball's environment as viewed from a stable perspective and orientation.

In another embodiment of the invention, the camera lens is connected to one or more fused fiber-optic bundles, which provide access to images outside of the ball. An example of the ball of this embodiment is shown at 300 in FIG. 3 and in a disassembled view at 310. At the core of the ball, camera 311 has aperture 312. Fused fiber optic bundle 313 provides aperture 312 with a matrix of images arriving from one of numerous individual, flexible, fused fiber optic bundles connected from points around the spherical exterior surface of the ball to the camera at the core of the ball. Exterior lens 314 focuses an image to be carried by fused fiber optic bundle 315 to aperture 312 for capture and storage by camera 311. An on-board orientation sensor provides an on-board processing unit with the ability to identify only those images captured while their respective fiber optic endpoints were facing a desired ground-based target subject.

Figure 3:
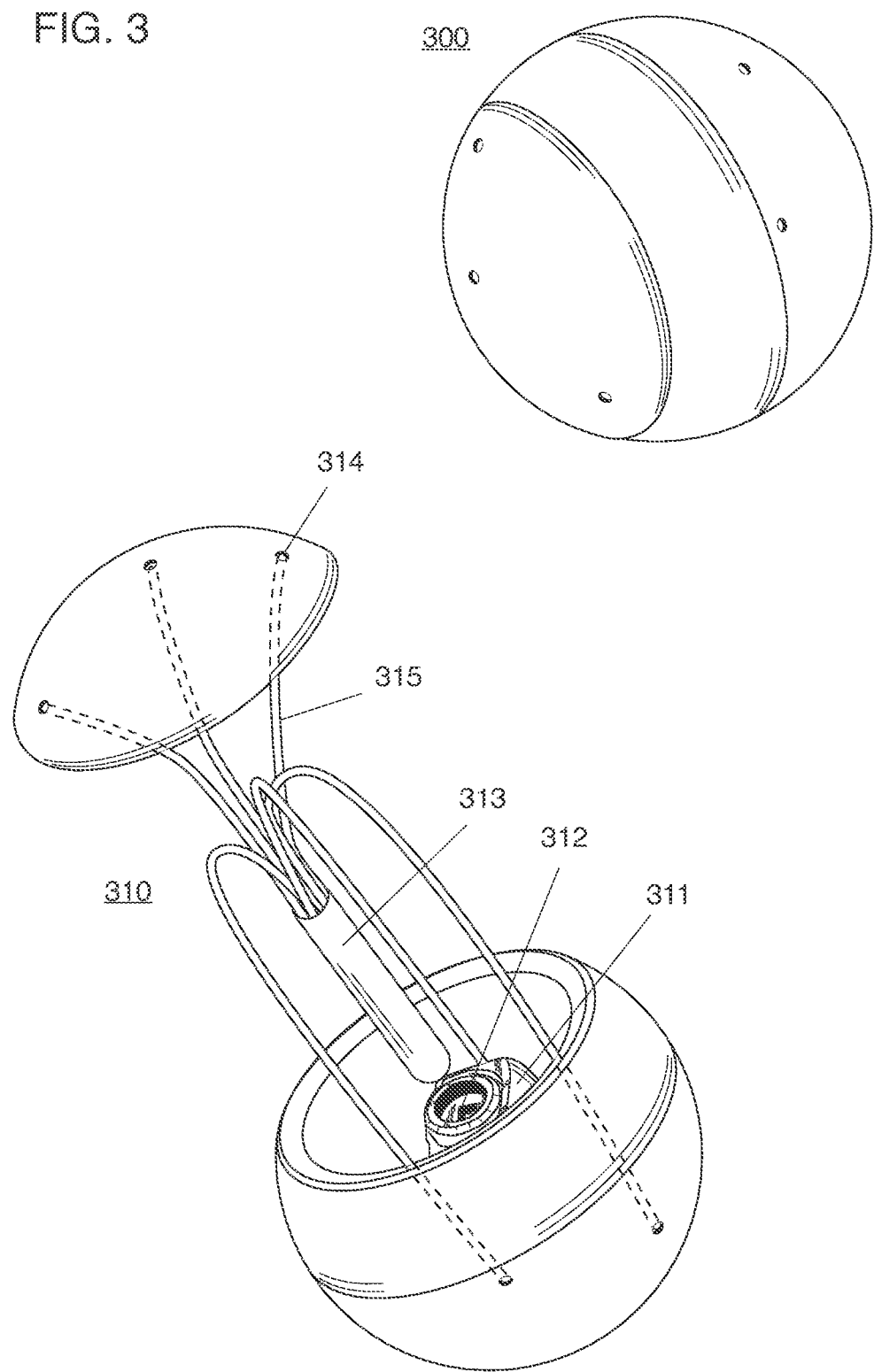
FIG. 3 shows an assembled view and an interior view of an example ball of this invention, with fused fiber optic bundles capable of providing a matrix of images to a single aperture.

The fused fiber-optic enabled ball as illustrated in FIG. 3 may be used in an alternative embodiment to capture a plurality of images at a single moment in the ball's trajectory for the purpose of stitching together a panoramic image. The on-board orientation sensor can provide the on-board processor with the ability to spatially transform each image captured to a fixed normal relative to the ground plane. A series of such panoramic images captured at successive moments over the arc of the ball's trajectory may be compiled into a viewable fly-through of the space through which the ball traveled.

The trajectory trigger may signal the camera to take a picture at one moment, for a still picture, or for a duration of time relative to a point of interest along the ball's trajectory. For example, the trajectory trigger may send an ON signal as the camera approaches its apogee and OFF signal shortly thereafter, in order to capture a moving picture video.

The trajectory trigger may signal the capture of a select set of discrete, still images as the ball is spinning along its trajectory, at singular points when the camera is facing in a desired orientation, so that when the images are compiled in sequence into a moving-picture video, the video itself depicts a scene as if the camera were panning over it rather than spiraling past it. For example, a camera contained within a ball could be triggered to take a still image each time its lens was facing the ground below. As the camera moved along its airborne trajectory, even while it was spinning within the ball an uncontrolled rotation, would only be triggered by the trajectory trigger when its lens was in a desirable orientation facing the ground below. When the set of discrete still images was combined together, the resulting video would depict a panning view of the ground beneath the ball as it moved through its trajectory, as if the ball containing the camera was not spiraling. Because a recreational ball such as a golf ball has a rotational velocity much faster than thirty revolutions per second, it is possible to capture images at a rate of at least $\frac{1}{30}^{th}$ of a second each time a particular face of the golf ball is facing in a certain direction in order to produce a stable moving-picture at a frame rate of $\frac{1}{30}^{th}$ of a second.

In an embodiment of the ball of this invention, the ball contains a camera which takes a continuous stream of still images over the course of a spiraling trajectory; and the ball's flight data such as velocity, acceleration, position and rotation is also sensed and stored over the course of the trajectory; and each still image is paired with corresponding flight data at the time the image was captured; and a subset of images is subsequently selected based on an algorithm that uses a seed image taken at a particular perspective to find other images taken from a similar perspective over the ball's flight; and the set of resulting images combined to produce a single moving picture video; the result being a video "walkthrough", or flyover of the environment through which the ball passed; and the video's perspective being editable after the ball has completed its flight by reselection of the seed image or desired viewing angle or any other similarity between images as analyzed from the ball's position/orientation/velocity data.

One or multiple cameras may be contained within the ball to create a series of stereo image pairs captured over the course of a spiraling ball's trajectory; the stereo image pairs being representative of the parallax of a pair of human eyes; and this series of series image pairs selected and cultivated based on corresponding flight data such that only stereo pairs for a desired perspective from the ball are chosen; and the resulting subset of image-pairs compiled to produce a coherent 3-dimensional video "walkthrough" or flyover.

The trajectory trigger may employ an accelerometer or similar device to provide positioning, velocity and acceleration information.

The trajectory trigger may use an impact sensor to identify the occurrence of a series of successive bounces to determine the ball's approximate trajectory, the estimated timing of its arrival at its apogee, and its arrival at points of interest along a subsequent trajectory as the ball continues bouncing. In this regard, the trajectory trigger may identify patterns in the ball's bouncing behavior that are analyzed and stored for use in the actuation of a mechanical action from within the ball, or for signaling an action within the ball such as an image capture.

The trajectory trigger may use the camera's existing mechanical, optical and digital processing capabilities to calculate position, velocity and acceleration in flight. For example, auto-focus or range-finding means can be used to determine the current distance from a fixed point such as the earth below. The trajectory trigger may analyze data from successive image captures to determine its current distance from a fixed point such as the earth below, as well as its current velocity and acceleration.

The trajectory trigger can be preset to trigger the camera when it reaches a particular velocity in flight, for example when the camera is moving at or near its maximum velocity. In this regard, a baseball could be thrown at a baseball player to capture video along the pitching path. As the ball begins to slow down, the camera lens could be retracted and insulated from the batter's impact.

The trajectory trigger may identify and responds to the capture of particular captured image. For example, the trajectory trigger can signal the camera when it detects a human face in the captured frame. Alternatively, the trajectory trigger can signal the camera when it detects the contrast between the earth and the earth's horizon.

By comparing the clarity of successive image captures as the camera moves along a trajectory, the trajectory trigger can estimate when it is approaching the apogee of its trajectory. Because a ball's velocity in relation to its subject approaches zero as the ball reaches its apogee, the clarity of the subject will remain fairly constant at the apogee. Therefore, if a camera has a fixed depth of field, the trajectory trigger may use Fourier analysis or other processing methods over successive captured frames while the ball is in flight to determine when the rate of change in pixel clarity (i.e. change from low to high frequency or vice-versa) approaches zero.

The Exterior Surface Defamation Trajectory Changer

The exterior surface deformation trajectory changer is the active means contained within the ball of this invention capable of effecting a physical deformation of the exterior surface of the ball in order to produce a desired interaction with aerodynamic forces so as to control the ball's trajectory. Such a change in trajectory may be expressed as the favoring of a particular direction or a change in lift.

The purpose of the exterior surface deformation trajectory changer is to enable the ball to move towards a desired subject, shift the trajectory over a desired path, or stabilize the ball to improve image capture capability.

The exterior surface deformation trajectory changer may change the exterior surface of the ball irrespective of the ball's current location, orientation or trajectory in order to achieve a desired trajectory. For example, the ball may be deformed into an egg-shape during flight so the ball effectively changes mid-flight from a bluff body shape to a streamlined shape with laminar airflow from head to tail.

The exterior surface deformation trajectory changer may act on the exterior surface in synchronicity with the revolution of the ball, allowing for individual changes to occur precise areas of the ball relative to the vector of aerodynamic forces to create a virtual aerodynamic surface. For example, a change made to a succession of dimples on a golf ball's exterior surface only at the moment when a particular dimple was on one side of the ball (relative to earth) would result in the ball shifting its trajectory relative to that side. This example illustrates that the function of a trajectory trigger may be required for the successful operation of exterior surface deformation trajectory changer.

A trajectory trigger may be used to signal the exterior surface deformation trajectory changer, upon the trajectory trigger's analysis of the ball's velocity, position, rotational velocity and other flight data. The logic of the trajectory trigger signals the deformation at the exterior surface to occur at a precise time in the ball's rotation, allowing for control of surfaces relative to the leading surface at that moment, the leeward surface at that moment, the left, right, upper and lower surfaces at that moment.

The exterior surface deformation trajectory changer may be a mechanical force, a hydraulic force or any other controllable expression of force acting from within the ball to effect a change on the exterior surface.

In one embodiment of the trajectory-changer of this invention, a portion of the exterior surface of the ball is constructed using a material of substantially flexible property such that corresponding at a number of points surrounding the balls exterior surface exists an underlying mechanical actuator which applies an outward or inward force on the inside surface of the ball's exterior shell. The flexible portion of the shell bulges out in a convex contour or caves in a concave contour, expressed as a series of points, which change from dimples to pimples based on the logic of the trajectory trigger.

Because the ball of this invention is in free rotation, not aligned on a particular axis to aerodynamic forces like a rocket, it is anticipated that the exterior surface deformation trajectory changer must control a change in direction or lift by creating a ripple of changes from point to point along the exterior surface, with the ripple moving along the ball's exterior surface opposite to (and at the rate of) the ball's rotation. In this manner, for example, an aerodynamic "flap" could be created on a golf ball's lower surface (relative to arriving aerodynamic forces) by creating one row of pimples at the points that were on the ball's lower surface at a single moment in time; and at a moment later creating a second row of pimples at the new points that were on the lower surface, retracting the first set; and then creating a third row and retracting the second; and continue this action to create a ripple moving opposite the vector of the ball's rotation, so that the ripple produced a virtual wall of pimples on the ball's lower surface (relative to aerodynamic forces acting on the ball), thereby producing a desired lift.

As described, the exterior surface deformation trajectory changer may act on the surface of the ball to create an asymmetric condition relative to aerodynamic forces acting on the ball.

The exterior surface deformation trajectory changer is also capable of changing the ball's trajectory by effecting changes on the surface that are expressed symmetrically around the ball, in order to decrease drag by creating a thin unseparated layer of turbulent air. In this regard, for example, the dimples of a golf ball of this invention which serve to decrease drag can be modulated in depth and contour for particular windspeeds, rotational velocities, trajectory mapping goals and other in-flight performance criteria determined while the ball is in flight.

The golf ball of this invention, with an exterior surface deformation trajectory changer being signaled by a trajectory trigger, is capable of fine-tuning dimple depth, contour and shape for any possible aerodynamic interaction encountered at any point during the ball's trajectory.

The ball of this invention may be expressed as a golf ball constructed so each concave dimple has a flexible dimple-pit measuring only a fraction of the diameter of the entire dimple, capable of responding to slight pressure from within the ball so as to create a convex bump acting outwardly from the dimple-pit. Pressure on each dimple pit of a golf ball can arrive from the shaft of an electronic solenoid at the ball's core, or from the shaft of one electromagnetic solenoid per dimple, arranged to correspond with each dimple beneath the ball's exterior surface.

As described in the above example, the internal mechanical actuator may derive its ability to force a change in the ball's exterior surface by electrical means, such as in the activation of a solenoid. An interior view of an example golf ball of this type is shown at 400 in FIG. 4. The golf ball has an exterior surface with conventional dimples such as at 401. Core 402 is a sphere contained within the center of the golf ball, itself containing the trajectory trigger logic. Solenoid 403 is one of a plurality of solenoids mounted on core 402, with shaft 404 extending outward to a dimple on the surface of the ball. Each of the solenoids, shafts and corresponding dimples are controlled by connection to a trajectory trigger within core 402 which is processing the ball's velocity, rotation, acceleration, position and other factors regarding the ball's trajectory.

An exterior view of the golf ball 400 is shown at 410, with dashed lines illustrating the actuators at the center of the ball. Tips of each shaft at 411 are shown flush with the exterior surface of each respective dimple. As the golf ball travels at high speed during routine play, the extension of any particular shaft tip is significant in altering the aerodynamic profile of the ball and thus changing its airborne trajectory. The trajectory trigger bases decisions regarding extension of a shaft on the current trajectory, orientation, rotational velocity, acceleration and other factors governing the in-flight path of the ball.

Figure 5:
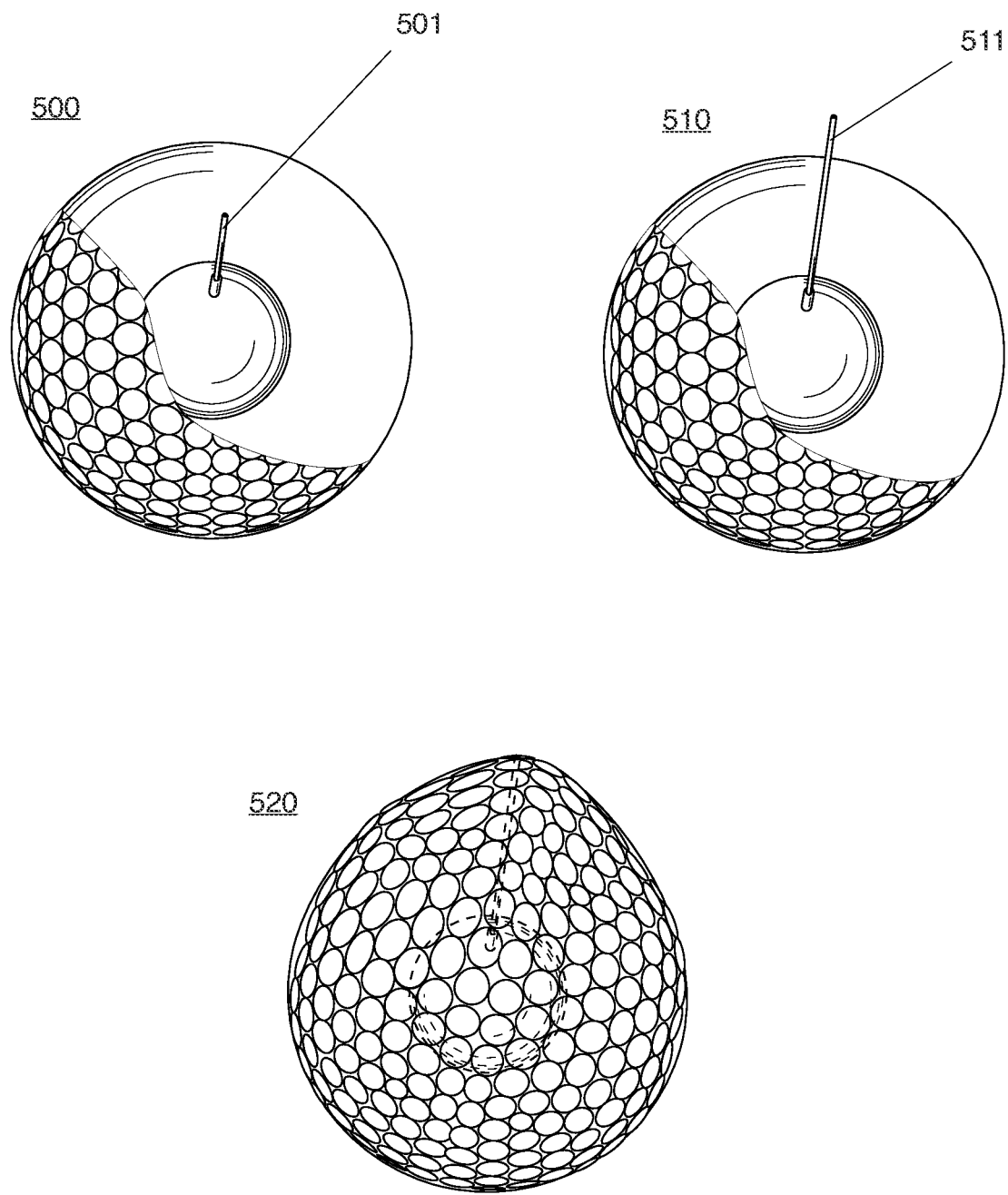
FIG. 5 shows two interior views and an exterior view of an example golf ball of this invention with a shape-altering mechanism capable of changing the ball's airborne trajectory.

Another example of a ball capable of changing its aerodynamic disposition is shown at FIG. 5. This ball has a core containing a single solenoid and shaft similar in its extension and retraction as described in FIG. 4. Unlike the ball of at FIG. 4 which extends a shaft from a single dimple when the internal solenoid is actuated, however, the shaft tip of the embodiment of FIG. 5 is entirely contained within the ball even when extended. At rest as shown in an interior view at 500, shaft 501 is retracted and does not press outwardly on the ball. When the solenoid is actuated as shown at 510, shaft tip 511 presses outwardly against the interior surface of the ball, changing the shape of the ball as shown at 520, thereby altering the aerodynamic profile of the ball as it travels at high speed. The example shown in this figure illustrated has an exaggerated egg shape, and is entirely unrealistic, especially considering that a golf ball is not typically traveling with a distinct leading surface and trailing surface. In an actual application, however, this example is used to suggest that a slight adjustment to the ball's shape, even one that is nearly imperceptible to the human eye, is sufficient to significantly alter a ball's trajectory during a high-speed flight.

Because a golf ball requires significant force to initiate a high-velocity trajectory, it is anticipated that the solenoid shafts of FIG. 4 and FIG. 5 might not withstand the initial impact of a golf club. The shafts of FIG. 4 and FIG. 5 are shown as examples of methods to alter the exterior surface of a golf ball, but the ball of this invention may benefit from other methods for storing, transferring and expressing energy using flexible shafts, hollow tubes for the transfer of air or liquids, springs, coils, bladders, pneumatic pistons, etc.

A possible method for dynamically changing the exterior surface of the ball during flight which could withstand the forces of impact would be in the application of hydraulic pressure. In one embodiment of a golf ball with hydraulic-activated dimples would include the exterior layer and a sub-layer divided into cells, one cell per dimple, and with each cell containing a small amount of hydraulic fluid, and with the cell further connected on its inward facing surface to a liquid-carrying tube, connected to a pump at the core of the ball, and activated by the logic of a trajectory trigger to determine the correct modulation of pulsed pressures required to achieve a desired aerodynamic interaction as the ball passes through its trajectory.

Another possible method for altering the exterior surface of a recreational ball may be expressed by an internal mechanical actuator which derives its ability to force a change in the ball's shape or exterior surface by air pressure, for example by capturing air in narrow tunnels or pockets; harnessing the moving air and converting it to electrical energy or a mechanical air pressure pump within the core of the ball; and thereby actuating a change to the surface profile of the ball in order to change the ball's lift.

The entire actuation system used to change a ball's aerodynamic profile by applying force from within the ball can exist within a thin laminar layer beneath the exterior surface of the ball, allowing the core of the ball to be available for use for other purposes, for example to contain a camera as described earlier in this document. As an example of a possible mechanical system that can reside below the exterior surface, a substantially flat magnetic coil may be embedded in a layer below a golf ball's exterior surface and corresponding with a dimple; and the dimple itself constructed of a material that is responsive to subtle changes in the surrounding magnetic field; and by activation of the magnetic coil from a signal by the logic of a trajectory trigger, the exterior surface of the dimple may be slightly altered and thus the ball's trajectory can be manipulated.

In another embodiment of the invention, the pimples or perturbations described earlier regarding FIG. 4 are extremely small, perhaps a fraction of the diameter of a single dimple, and act as a combined system to alter the aerodynamic profile.

In another embodiment of the invention, the aforementioned perturbations are as relatively large, where the shifting of a single perturbation can alter the aerodynamic profile of the ball.

The Internally Contained Mechanical Trajectory Changer

The ball of this invention is capable of changing its own trajectory while moving at high speed and at a high rotational velocity by creating pulses of force at precisely timed moments in its airborne trajectory, thereby favoring a particular direction or inducing fine disturbances in airflow capable of increasing lift.

The purpose of the internally contained mechanical trajectory changer is to enable the ball to move towards a desired subject, shift the trajectory over a desired path, or stabilize the ball to improve image capture capability.

The internally contained mechanical trajectory changer is the mechanical means contained and expressed entirely inside the ball of this invention which itself exerts a force that acts on the entire ball so as to cause the ball to achieve a desired aerodynamic interaction with the force of headwinds.

The internally contained mechanical trajectory changer may cause the ball precess around a moment other than its physical center, thereby causing a desired interaction with aerodynamic forces acting on the ball's surface. Controlled by the trajectory trigger, with sensors capable of detecting the orientation of the ball, the actions of the internally contained mechanical trajectory changer can be synchronized with the spinning of the ball as it spirals through its trajectory. The ball's center of mass may be moving within the ball along the arced trajectory independent of the physical center of the ball.

The internally contained mechanical trajectory changer may enable the ball to position a perturbation on the ball's exterior by shifting weight at the core of the ball such that the center of gravity shifts away from the center of the ball. By shifting the location of the perturbation, the internally contained mechanical trajectory changer thereby allows the ball to control a desired interaction with aerodynamic forces acting on the ball's surface. With the addition of a trajectory trigger, capable of detecting the orientation of the ball, the actions of the internally contained mechanical trajectory changer can be directed to achieve a particular goal in changing its trajectory or stabilizing the ball for image capture.

In an example embodiment of an internally contained mechanical trajectory changer of this invention, a battery is used to shift a mass contained within the ball, and the resulting counterforce itself causing a shift in the disposition of the outer housing of the ball relative to aerodynamic forces acting on it. In this embodiment, the trajectory trigger signals the pulsed or intermittent shifting of the interior mass based on the ball's position, velocity, rotation, wind resistance and other flight data.

Unlike a ball that precesses around an off-center center of gravity, the ball of this invention can employ an internally contained mechanical trajectory changer at a precise moment in the ball's trajectory and disposition to aerodynamic forces, so that the force from within is of particular importance to the exact condition of the ball at that given point. The movement of a mass at the core of the ball synchronized opposite the spin direction of the ball allows the ball to control, direct and inhibit the precessing of the exterior surface of the ball around its center of gravity.

While the ball of this invention is anticipated to be a sphere, generally symmetric with respect to aerodynamic forces acting upon it, the ball may have one or more asymmetric, fixed perturbations on its exterior surface. Such a perturbation may exist at a small fraction of the diameter of the size of the ball, and for balls that enter a high-speed trajectory it is anticipated that the perturbation may so small as to be nearly imperceptible to the human touch. Such a small perturbation, capable of disrupting laminar airflow across the balls surface, may provide a suitable aerodynamic impact such that the ball's direction, lift and stability are entirely controllable when the perturbation is maintained in a fixed position as the ball moves through its trajectory.

An internally contained mechanical trajectory changer, continually shifting an internal mass in a fixed direction independent of the spin of the ball, can move the center of mass to favor a disposition where an exterior perturbation interacts with headwinds in order to either change the ball's trajectory towards a desired direction or stabilize the exterior surface of the ball so an embedded camera is advantaged in its view of a desired subject.

The internal mass may be moved substantially so the ball's center of mass is at the front of the ball relative to aerodynamic forces acting on the exterior of the ball.

The internal mass may be spun within the ball in counter revolution to aerodynamic forces acting on the surface of the ball in order to, for example, position a perturbation on the ball's surface at a desired disposition relative to headwinds for the purpose of changing direction or stabilizing the picture-taking orientation of an embedded camera.

The internal mass may be spun within the ball to create a gyroscope which favors the position of a perturbation on the ball's surface at a desired disposition relative to headwinds for the purpose of changing direction or stabilizing the picture-taking orientation of an embedded camera.

A ball with a slight perturbation as describe by the above embodiment is a unique instance of a recreational flying object that is predominately spherical in shape, yet moving and spinning at a velocity where a subtle, controlled expression of a shift in inertial forces can produce a desired change in the airborne trajectory.

The trajectory trigger may control the operation of a motor which has a housing affixed to the interior surface of the ball's exterior housing; and the motor has a shaft extending to the opposite end of the ball; and on the shaft is a metal weight; and the center of the metal weight represents the ball's center of mass so that the metal weight is always at the leading portion of the ball when in flight; and with a dimple existing on the exterior surface of the ball at a point on the side of the ball away from its leading or trailing surface; and the motor engaged while the ball is in flight so that the counter-forces of rotation acting on the exterior surface of the ball by attachment to the motor housing cause the dimple to continually re-align itself on one side of the ball; and the realignment of the dimple creates aerodynamic drag on that side of the ball, changing the trajectory so that the ball shifts toward that side.

The above example allows a dimple to be rotated to a particular side of a ball while in flight, effectively using aerodynamic drag to pull the ball in that direction. If the motor of the above example is mounted on a gimbal and the gimbal is affixed to the interior surface of the ball's exterior housing, the dimple could be rotated to favor a particular side, as well as towards the leading or trailing surfaces of the ball in flight.

The ball of FIG. 4 as earlier described one in which the shafts of a number of solenoids extended from the ball's core to the exterior surface of the ball. If, however, the shafts of the ball of FIG. 4 were shortened so they did not approach the point of interaction with the exterior surface of the ball, and if instead a small weight of meaningful mass were placed at the end of each shaft, the ball's trajectory could be impacted by the extension and retraction of the shafts with no expression on the outer surface of the ball. Furthermore, with the addition of a trajectory trigger, the modulated extension and retraction of selective shafts could effect a change in the ball's disposition to aerodynamic forces such that its center of lift was controllable entirely from within the ball. On a ball of this invention with a single fixed convex pimple on its exterior surface, this type of internally contained mechanical trajectory changer could be used to ensure that the pimple was, even while spiraling around the ball, favoring the left side of the ball enough to pull the ball to the left.

It is possible for an internally contained mechanical trajectory changer to exist just beneath the exterior surface of the ball, leaving the volume of the core available for other purposes. As an example of an internally contained mechanical trajectory changer of this type, a golf ball may have, beneath its exterior surface, a layer of magnetic Ferro fluid. Immersed within the Ferro fluid, and positioned to correspond with each dimple of the golf ball is a magnetic coil activated by the trajectory trigger. When the magnetic coils are pulsed with electricity, the Ferro fluid in the immediate area of the coil solidifies, creating a slight shift in the center of mass and thereby causing enough of a disturbance so as to create an asymmetry in the ball's disposition to aerodynamic forces acting on it, and thus creating a controllable change in trajectory.

In another embodiment of the internally contained mechanical trajectory changer, a mechanical force applied at one endpoint of the axis of rotation of a gyroscope in a vector perpendicular to that axis is expressed as counterforce on the housing of the ball. It is anticipated that the mechanical means for applying force on the gyroscope may be by attachment of one end of its rotational axis to a motor or solenoid.

In another embodiment of an internally contained mechanical trajectory changer, three solenoids are housed within the ball with shafts at respective x, y and z axes, with each solenoid controllable by the trajectory trigger. The actuation of a particular solenoid's shaft would be expressed as an opposite force acting on the ball's housing.

An internally contained mechanical trajectory changer can be used to generate lift by creating a turbulence-inducing vibration when a ball enters a high-speed trajectory. This turbulence, if existing in a thin, unseparated layer of air, can reduce drag by insulating the ball's surface with the high-speed layer of moving air.

Additional Applications for the Trajectory Trigger

The trajectory trigger may trigger a flash at or near the camera trigger point, to illuminate the subject.

The trajectory trigger may activate an LED or audible signal in advance of the camera trigger point, to signal that an image will shortly be captured.

The trajectory trigger may activate an LED or audible signal in advance of the camera trigger point, to signal that the desired image has been taken and that the ball can be retrieved.

In one embodiment of the ball of this invention, normalized images representing the ground-based target subject are transmitted wirelessly to the ball's user. It is anticipated that the ball may include hardwired communications such as a USB or Firewire port to provide image data to the user upon completion of the ball's trajectory.

Information sensed and analyzed by the trajectory trigger may be stored or transmitted for uses other than related to the ball's own flight. For example, velocity information used to alter the ball's trajectory in flight may be communicated to a ground-based control system for display. In another example similar to the "black box" of commercial airplanes, the information from a ball's trajectory may be made stored by the trajectory trigger and later provided by connection or transmission to an external system.

Information sensed and analyzed by the trajectory trigger may be transmitted for immediate processing by a ground-based unit separate from the ball, and then returned to the trajectory trigger by a ground-based transmitter for the trajectory trigger's continued operation in signaling an action from with the ball.

The trajectory trigger within a particular ball may use its own transmitter and receiver to send information to and receive information from a second ball that is also in-flight, to determine its spatial relationship in flight to the second ball and thereby can initiate self-contained means to change trajectory for collision avoidance.

The Location Transmitter

In another embodiment of the ball of this invention, the ball contains a camera and a trajectory trigger and a receiver capable of receiving ground-based signals; and a separate ground-based location transmitter that sends its location to the receiving unit; and logic within the trajectory trigger that signals the camera when A) the received location information that defines a subject for image-taking is framed within the airborne camera's field of view AND ALSO B) the trajectory trigger determines that the ball is at an optimal point for picture taking in its trajectory (i.e. at its apogee). In this embodiment, because the camera within the airborne ball may itself be spiraling as the ball spins, the trajectory trigger must use its positioning information to determine an exact moment (or series of moments) to capture images of the subject.

It should be noted that, unlike airborne cameras of prior art which may be immediately triggered by a ground-based transmitter, the camera contained within the ball of this invention as described in the above embodiment is not itself immediately triggered by the transmitter. The location transmitter of this invention sends a constant stream of location information which is thereby available to the ball's internal trajectory trigger as it determines the best location in the ball's trajectory to capture an image of the subject at the transmitter's location.

In the above embodiment, the location transmitter is ground-based and hand-held by the person who threw the ball into its trajectory. The resulting images taken by the ball's internal camera are that of the ground-based subject near the transmitter.

In another embodiment of the ball of this invention, the location transmitter may be stored within the ball, and detachable from the ball when in use. If the ball is thrown in the air with the location transmitter still contained within its housing, the location transmitter is disabled and the trajectory trigger uses its trajectory data to determine when to capture an image. When the location transmitter is removed from the ball, however, the location transmitter begins transmitting information to the trajectory trigger, and the ball is pitched into a trajectory while the transmitter remains behind.

In another embodiment of the ball of this invention, the location transmitter is ball-shaped, and can be thrown separately from the recreational ball. In this way, the camera within the airborne recreational ball can be signaled by the trajectory trigger to "follow" the location transmitter's separate trajectory, capturing images over a range of subjects. The camera's focus is separately maintained to focus on a field of view beyond the airborne location transmitter while remaining fixed on the direction of the airborne location transmitter.

In an example operation of this embodiment, one person pitches the recreational ball high up into the air, and a second person throws the location transmitter in a lateral trajectory over a range of ground-based subjects. The trajectory trigger analyzes the ball's rotation and location, triggering the camera to capture all of the subjects in the field of view past the airborne location transmitter, as if the camera were smoothly panning and scanning over the entire area over which the location transmitter was thrown.

In another embodiment of the ball of this invention, the trajectory trigger can store location information received from the location transmitter, and later use this information to trigger the camera when the camera is at an optimal point in its own trajectory to capture the desired subjects. In this embodiment, the location transmitter is "training" the trajectory trigger before the ball containing the trajectory trigger and camera are thrown into the air. This embodiment allows a ball containing a location transmitter to be thrown before a recreational ball containing a camera, by the same person.

To further illustrate an example of this embodiment, a recreational ball containing a camera, trajectory trigger and receiver is held separately from a location transmitter. The person first throws the location transmitter over a group of friends, while the trajectory trigger within the held recreational ball receives and stores this location information. The person then throws the recreational ball into the air, at which time the stored location information is retrieved by the trajectory trigger. Using this location information as well as its own positioning information, the trajectory trigger delays until the recreational ball is nearing its apogee and then signals the camera to capture frames only from perspectives which would could be compiled as a video as a smooth, continuous panning shot across and high above the group of friends.

The Training Logic and Storage Unit

In another embodiment of the recreational ball of this invention, the ball entirely contains a trajectory trigger; and a camera that is triggered by the trajectory trigger; and a training logic and storage unit described herein. The training logic and storage unit enables the ball to be "trained" during a first stage of play, prior to entering a second stage when the ball is thrown high up into the image-capture trajectory. The purpose of the training logic and storage unit is to train the ball before its main flight so that the ball's camera can capture the trained points of interest to during the second-stage image capture flight.

The "training" accomplished by the training logic and storage unit occurs as follows: When the training logic and storage unit is turned on, it begins storing data that reflects the current location of the ball (available to and provided by the trajectory trigger), and the length of time that the ball is held at the location. The recreational ball containing the training logic and storage unit is then passed across an area of interest. To illustrate and example, a line of people are standing on a beach and the ball of this embodiment is carried by one person along the line. When the ball is held near the head of each person in line, the person holding it pauses for few seconds before moving to the next person. During this time, the training logic and storage unit is storing the physical location near the head of each person in line, and the approximate amount of time paused near each head. When the person holding the ball reaches the end of the line, he turns the training logic and storage unit off so the training logic and storage unit retains the stored location-time data in memory but is no longer storing new location-time information. Then, the ball is pitched high up into the air. The trajectory trigger has access to location information described earlier in this document, but also has access to the location-time information previously stored by the training logic and storage unit. The trajectory trigger uses the training logic and storage unit information to direct the camera toward each point of interest, continuing to capture frames according to the location and the time "trained" by the training logic and storage unit. The resulting captured frames, when compiled together, produces a viewable video which shows a scene from the ball's perspective of the people standing along the beach, focused towards each person's head for a short pause, and then panning or scanning along the line to the next person—as trained. The trajectory trigger has calculated the appropriate moments when the camera is capable of meeting its trained objective, according to the location-time data stored by the training logic and storage unit.

It is anticipated that the video or image frames captured under the above embodiment may require post-processing by an independent image processing unit if, for example, the captured image data is significantly more than required for a single desirable tracking shot.

It is anticipated that the training logic and storage unit has access to memory and logic within the trajectory trigger, including accelerometer, GPS, and other sensor readings, to provide the current location of the ball during training. It is also anticipated that the training logic and storage unit may use pre-flight image data captured by the camera, in its capacity identifying and storing the current location of the ball during training.

It is anticipated that the training logic and storage unit may be moving at high speed within a spinning, spiraling or precessing ball while still in its training mode, and can depend on the trajectory trigger to signal appropriate locations and times for picture capture, which are stored during training and recovered later by the trajectory trigger during the ball's non-training flight. In this regard, the ball can be tossed from one person to another during training, and then thrown high above for the image capture stage.

Gravity-Assisted Camera Aperture Stabilizer

In another embodiment of this invention, a spherical object such as a recreational ball can contain a camera which is independent from the ball's exterior housing, so that the camera's orientation is governed by gravitational force and the inertial forces moving the ball through its trajectory, but generally not impacted by rotational forces acting on the ball.

In this embodiment of the ball of this invention, the embedded camera is mounted within the ball, but independent of the ball's exterior housing so that when the ball is thrown into the air, the camera aperture remains generally stable in a direction fixed with respect to gravitational force. This enables the ball, for example, to take still images and video in an earth-facing orientation while the ball is thrown, spun or spiraled into the air.

Other Innovations of the Ball of this Invention

It is anticipated that the ball of this invention may be self-powered or enhanced by energy derived upon impact with a solid body such as a golf club, using a piezo element or other process for converting, storing and utilizing such energy.

It is anticipated that the ball of this invention, particularly a ball constructed of a translucent material and containing a camera and trajectory trigger, may be self-powered or enhanced by energy generated by passive solar cells encapsulated beneath the ball's exterior surface.

It is anticipated that the ball of this invention may be self-powered or enhanced by the storage of compressive forces and controlled release of such forces. For example, a golf ball of this invention may be designed so that impact with a golf club forces a volume of liquid through a valve and into a pressurized bladder, and the liquid's subsequent release from the bladder be controlled over a prolonged period; and release of the liquid and its application in changing the ball's trajectory be governed by information analyzed by a trajectory trigger.

It is anticipated that the uniquely innovative combined elements of this invention, for example 1) the combination of (1a) an internal trajectory trigger and (1b) camera, or 2) the combination of in (2a) internal trajectory trigger with (2b) means for changing trajectory by (2b-1) altering the aerodynamic profile by deforming the exterior surface of a flying object from within the flying object or (2b-2) by shifting mass or an inertial force contained entirely in the interior of a flying object, are all applicable to other recreational airborne objects of non-spherical shapes.

It is anticipated that while the recreational ball of this invention is expected to encounter aerodynamic forces as the ball is pitched into the air, it is possible to create an embodiment that operates while in a liquid, for example in a recreational pool or in an ocean, and with all the components working to create a desired effect for the operating environment.

It is anticipated that for a sphere of a given volume and mass, an internal timer may be sufficient to approximate position information.

It is anticipated that one or more improvements described by the invention described herein may be incorporated into standard recreational balls or other recreational airborne objects such as bouncing balls, tennis balls, golf balls and baseballs.

Network of Thrown or Projected Cameras

As described earlier in this specification, a ball camera may provide image and video data to its user wirelessly to a remote device, or via hardwired communication technology such as USB or FireWire. Such a camera may send and receive data such as location or image data, over a network, to a remote, networked client, such as a ground-based unit. Also as described earlier, a camera in one trajectory may communicate with a second camera thrown or projected in an independent trajectory. Also as described earlier, image data captured by a camera may be processed by a networked client device. And processed data may be returned from the client device unit to the camera.

The advent of systems capable of managing extremely large and complex data sets, or "big data," makes possible the processing of vast quantities of image data, including still images, video, stereo and multi-dimensional representations of image data including sensor data. The ball camera of this invention, benefiting from the use of high-speed cameras capturing large swaths of image data, as well as the generation of large quantities of sensor data, requires consideration of large networks, cloud-based archival services and computing, distributed processing, parallel processing, the systems necessary to process big image data generated by hundreds or thousands of baseball or marble-sized projectile cameras.

A wireless network, whether short range or cloud-based, makes it possible to increase the quantity and scope of collected image data. Beyond data collection, a ball camera network further enables the control of image capture from a remote location. Other improvements made possible by a networked camera and remote control unit, completely scaleable for systems managing and processing big image data, are described earlier in this specification. Further improvements described herein propose the collaboration of multiple networked devices in order to complete a shared task.

The camera network of this invention is understood to be a plurality of devices at least one of which is a camera, each device capable of communicating with at least one other device in the system via wireless or hardwired connection.

As the number of throwable camera balls in a single networked system increases, it is increasingly unwieldy to access image data if a hardwired connection is required of each camera to access image data. In this regard, a significant advantage of a wireless network is in the collection of a high volume of camera data by a single device, available to any one user with access to the network.

Networked cameras are capable of operating collaboratively towards completion of a variety of shared tasks possible with the utility of one or more ball cameras thrown or projected into an airborne trajectory.

As described earlier in this specification, a camera ball having at least one aperture with a partial view to the external environment can stitch a full spherical panorama from images captured while the camera is spinning. Also described earlier in this specification, a camera ball having a full spherical view of its external environment, such as one that employs the fiber optic bundle of FIG. 3 or one having multiple cameras within the same housing, can produce a spherical panorama at any point in its trajectory.

FIGS. 8 and 9 illustrate the conceptual operation of a ball-shaped camera and a remote computer as described earlier in this specification.

In FIG. 8, throwable camera ball 801 is thrown into an airborne trajectory over scene 800. In this example, camera ball 801 is a rapidly spinning, spherical housing with multiple camera apertures. To generate a spherical panorama as shown in front hemisphere 810 and rear hemisphere 820, a captured image with bounds represented by a dotted rectangle 811 is stitched to a second captured image with bounds represented by a dotted rectangle 812. As described earlier in this specification, the iterative process can be repeated until the camera captures images of the entire panorama. Dotted lines in 810 and 820 are provided for illustrative purposes to show the stitching boundaries of the multitude of individual images.

The full spherical panoramic image represented by hemispheres 810 and 820 can be transmitted wirelessly from the networked camera to a ground-based user, as described earlier in this specification. As shown at FIG. 9, the spherical panoramic image is flattened into two-dimensional plane 900 to represent original scene 800. As shown at 910, a user of desktop computer 911 views a video depicting a panning view, over time, across the larger two dimensional plane shown at 900, represented for illustrative purposes outside computer 911 as virtual image 912.

In an embodiment of the image capture system of this invention, networked cameras collaborate in the generation of a panoramic image. FIG. 10 illustrates a conceptual operation of such an embodiment. As shown in FIG. 10, cameras 1001, 1002 and 1003 are thrown into independent trajectories over scene 1000.

Camera ball 1001, equipped with position and orientation sensors, is capable of capturing images 1010 and 1020, representing the mountains of scene 1000. As shown, images 1010 and 1020 have been rotated by camera ball 1001 with Earth below and sky above. Camera ball 1001 is capable of stitching images 1010 and 1020 together. As earlier described, this rotation and stitching process can be repeated on successive image captures by camera 1001 to produce swath 1030.

On an independent trajectory, camera balls 1002 and 1003 are similarly capable of producing respective swaths 1040 and 1050. These independent operations are described earlier in this specification.

A network for sharing data makes it possible for swaths 1030, 1040 and 1050 to be stored on one network device, for example one of the three camera balls 1001, 1002 or 1003, for further processing. Orientation and position sensors fixed within in the housing of each of camera balls 1001, 1002 and 1003, indicating the orientation and position of each swath, make it possible for the swaths to be rotated, scaled or otherwise transformed to a common coordinate system. Once transformed to this coordinate system, swaths 1030, 1040 and 1050 can be stitched together to produce a single, larger panorama depicting the entirety of scene 1000.

As described earlier in this specification, A group of throwable ball-shaped cameras can be thrown retrieved independently, collected separately, with respective swaths of image data stitched into one panorama. The ball shaped cameras described earlier teach of a common coordinate system for rotation, the orientation relative to Earth for example, making possible the stitching of data generated by these cameras. A network of cameras enables individual swaths of image data to be transmitted to a common processor for stitching, image processing and other transformations. A network of cameras also facilitates the transmission of commands between cameras and network devices, status updates as well as the sharing of sensor data necessary for completion of a particular task.

The geometry of a scene available to multiple camera balls is complex, providing significant advantage over one or more non-networked camera balls.

The geometry of the area visible to a single camera ball such as camera ball 1001 in FIG. 10, at any one point in its trajectory, is limited by the bounds of visibility from the current location. In capturing this geometry on a digital camera capable of producing a 2-dimensional image, or in presenting this geometry on a printer or 2-dimensional display, the visible area may be most effectively considered as a spherical panorama, lacking depth information for any given point in the original scene. The geometry of the area visible to multiple camera balls in flight can only be described as an amorphous blob since the shape changes over time. This blob has unique characteristics, for example its ability to encompass two sides of the same object. In this respect, in an imaging system deploying multiple camera balls, a multitude of unique opportunities exist for two-dimensional and three-dimensional capture, recognition, stitching and further manipulation.

FIG. 11 illustrates a conceptual example of the unique image stitching geometry available to networked camera balls 1101, 1102 and 1103, tossed in independent trajectories 1105, 1106 and 1107 over scene 1100. At one moment in their respective trajectories, the three camera balls 1101, 1102 and 1103, illustrated at 1111, 1112 and 1113, are together capable of producing a tubular-shaped image with hemispheres capping either end, a portion of which is illustrated at 1120. Vertical dotted lines and arrows 1121 suggest the remaining portion of the image forms a tubular shape, the entirety of which is not shown in this depiction. This example tubular shape image is generated by the stitching of swaths captured by each camera, with overlapping image data discarded.

While FIG. 11 shows the expansion of the visible space available for image capture as the number of cameras increases, advantages of a network of camera balls are multifold.

Multiple cameras on independent trajectories, operating in collaboration, are capable of producing imagery not possible with a single camera projected over multiple trajectories. For example, multiple cameras can be synchronized to simultaneously capture images of all sides of a moving object, the captured images stitched into a single panorama.

Multiple networked ball-shaped cameras make possible a cost-effective approach to simultaneous localization and mapping (SLAM) techniques. The image capture system of this invention teaches that a handful of marble-sized camera balls thrown through a dense thicket of trees, entirely incapable of self-sustained flight or locomotion, would be a faster, more efficient and cost-effective tool for scene mapping than a squadron of throwbots or a fleet of drones. A plurality of networked throwable cameras operating collaboratively is also preferable to a single camera ball requiring retrieval before entering a second trajectory.

Multiple cameras on independent trajectories are capable of providing seamless representations of multiple sides of an object or environment. While a single ball on a trajectory might be capable of revealing the front and back of an object, other views such as an underside might remain occluded during any single trajectory. As an example, a video depicting a panning view around the surfaces of a table can be produced by two balls projected in independent trajectories, one above and one below the table. Such a video would not be possible with a single ball unless the ball was retrieved or otherwise redirected and projected through a second trajectory. A single ball, even one capable of being retrieved and re-projected, would not be able to simultaneously capture the upper surface and undersurface of a moving vehicle.

In an example operation shown in the conceptual illustrations of FIG. 12, scene 1200 shows network cameras projected into trajectories that place them around a subject of interest at single point in time. Motion picture filmstrip 1250 is comprised of a sequence of frames representing the view available to the cameras at the moment when a snapshot is triggered. Cameras 1201, 1202, 1203 and 1204 capture respective images 1251, 1252, 1253 and 1254. Equipped with position and orientation sensors calibrated to the same three-dimensional space, such as that of Earth, each network camera is thereby capable of rotating and otherwise transforming the geometry of respective image captures to a common coordinate system. The subject of interest in filmstrip 1250 is scaled to a uniform height, and rotated to a common orientation, in this example the orientation of person 1210 relative to Earth. The orientation of each camera in the network at the time of capture is inversed to normalize the orientations. When filmstrip 1250 is viewed using a projector, persistence of vision creates the simulated illusion of a tracking shot around person 1210 by a single camera, actually derived as described by multiple cameras.

If the location of person 1210 is unavailable to network cameras 1201, 1202, 1203 and 1204, triangulation approaches are available to improve the transformation necessary to arrive at a common coordinate system necessary for the generation of filmstrip 1250. These approaches may use camera positions relative one another, crude estimates of proximity from a camera to a desired subject of image capture, image analysis or other approaches to improve scale, perspective and other geometric transformations arriving at a common coordinate system.

As described earlier in this specification, it is anticipated that views from multiple cameras can be composited into stereo pairs for the production of three-dimensional images and moving pictures. Such cameras would benefit from all of the advantages of a network described herein.

Figure 13:
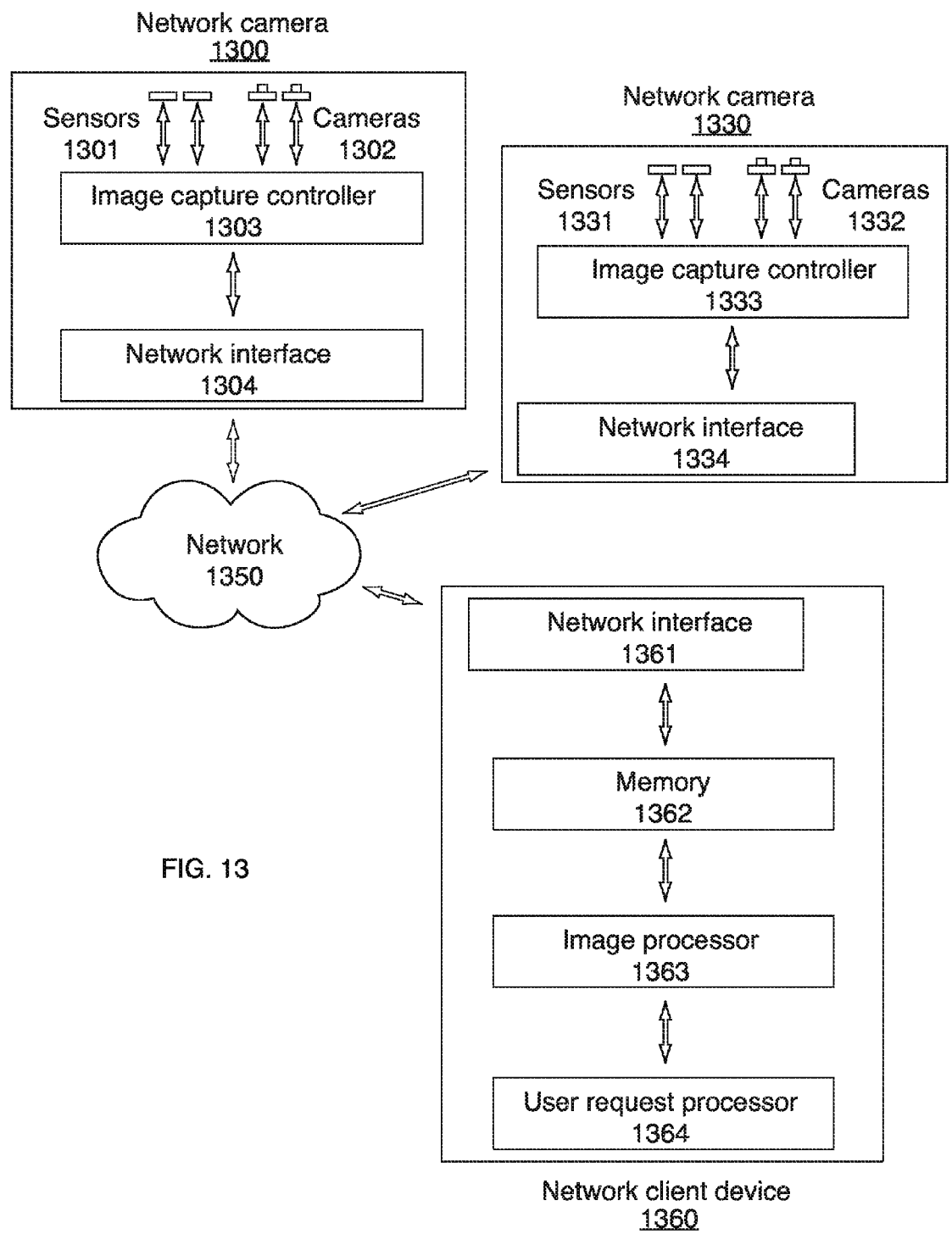
FIG. 13 is a block diagram illustrating the operation of the preferred embodiment of the image capture system of this invention.

An example operation of the preferred embodiment of the image capture system of this invention is illustrated in the block diagram of FIG. 13, in which the stitching of image data generated by two network cameras is processed by a client device.

Network ball-shaped cameras 1300 and 1330 are suitable for being thrown or projected into a trajectory. Network camera 1300 is comprised of cameras 1302 connected to image capture controller 1303. Network camera 1300 further comprises orientation and position sensors 1301, to determine the orientation and position of network camera 1300 at the time of an image capture. Image capture controller 1303 reads sensor data, and triggers image capture. Network interface 1304 receives instructions from network devices and sends image data, position data and orientation data to devices connected to network 1360. Functioning as described, network camera 1300 is described earlier in this specification.

Network camera 1330 is comprised of cameras 1332 connected to image capture controller 1333. Network camera 1330 further comprises orientation and position sensors 1331, to determine the orientation and position of network camera 1330 at the time of an image capture. Image capture controller 1333 reads sensor data, and triggers image capture. Network interface 1334 receives instructions from devices on network 1350 and sends image data, position data and orientation data to devices on the network.

Client device 1360 sends and receives data over network 1350 via network interface 1361. Memory 1362, connected to the network via network interface 1361, is the shared medium in which image data generated by network cameras 1300 and 1330 is stored. Position and orientation of the network cameras at the time of capture is also stored in memory 1362. A similar image capture configuration is described earlier in this specification, with a ground-based user receiving image and sensor data for completion of a stitching operation.

Client device 1360 is anticipated to be any computing device including, but not limited to, cellular phones, personal digital assistants, tablet computers, desktop computers, portable computer, etc.

It is anticipated that memory 1362 may utilize volatile memory such as RAM, non-volatile memory such as a flash drive, or a hybrid such as virtual memory, or, as a cost-effective strategy for managing big data, utilizing traditional storage such as magnetic or optical media. It is anticipated that digital storage technologies include rapid-access memory capable of real time acquisition, processing, streaming through the network and real-time access by the client device to image and sensor data generated by network cameras such that live viewing of stitched panoramas from one or more cameras is possible. It is anticipated that parallel processing enables the user to receive a portion of an image at the same time a portion of the same image is being stitched, processed, communicated over the network to the client device, or otherwise being operated on in methods or systems known to those skilled in the art of parallel processing and real-time image management.

Client device 1360 further comprises image processor 1363 connected to memory 1362 and user request processor 1364. User request processor 1364 comprises an input device and an output device such as a display. The input device may be a keyboard, keypad, mouse or other user input technology known to those skilled in the art. The display may be a monitor such as a CRT or a thin film transistor (TFT) display screen, or other display technology known to those skilled in the art.

While the preferred embodiment describes user request processor 1364 connected to memory 1362 and network interface 1361 through image processor 1363, it is anticipated that user request processor may be directly connected to memory 1362, or to network interface 1361. For example, a request from the user to instruct network cameras of a desired location of image capture can be signaled from user request processor 1364 to network interface 1361 without requiring function of or image processor 1363 or memory 1362. The block diagram of FIG. 13 is intended to illustrate the collaborative functions of the client device and network cameras minimally necessary to defining an embodiment of the image capture system of this invention, not intended to limit the embodiment to one example workflow.

In operation of the preferred embodiment of the image capture system of this invention, as shown in FIG. 13, network cameras 1300 and 1330 are projected into airborne trajectories over the same environment. Image capture controller 1303 triggers an image capture by any of cameras 1302 at any time a camera is facing the Earth below as signaled by orientation sensor 1301. Similarly, image capture controller 1333 triggers an image capture by any of cameras 1332 at any time a camera is facing the Earth below as signaled by orientation sensor 1331.

Upon successful completion an image capture, image capture controller 1303 initiates a transmission through network 1350 to client device 1360, via network interface 1304. The transmission includes the image data, and the orientation data and position data representing the network camera orientation and network camera position when the image was captured. The transmitted data is received by network interface 1361 into memory 1362.

Independent of network camera 1300, network camera 1330 is operating in its airborne trajectory to capture images of the Earth below. The operation of network camera 1330 is identical to that of network camera 1300, with captured images transmitted via network interface 1334 through network 1350 to client device 1360. Thus, images from network cameras 1300 and 1330 are stored in memory 1362.

The primary objective of image processor 1363 in the preferred embodiment is to produce the widest possible seamless panorama of the Earth below as viewed from network cameras 1300 and 1330 over the course of respective airborne trajectories. Starting with a single, seed image, image processor 1363 identifies a second stored image capable of being stitched to the seed image at a neighboring edge, as determined by the respective positions and orientation datum of the two images. The resulting stitched image becomes the seed for an iterative operation to produce the widest possible seamless panorama.

In addition to identifying images capable of being seamed together, another function of image processor 1363 is to perform image processing operations on image data, camera position and camera orientation data sourced from network cameras. In the process of stitching images, for example, image processor 1363 may be required to rotate one image in order to stitch it to the neighboring edge of a second image. Image processor may be required to rotate one or more images to create a panorama oriented to match the orientation of the subject of image capture. Both rotation operations are possible using the orientation and position information generated by the network cameras.

Other image processing operations are anticipated by image processor 1363 including, but not limited to, scaling, perspective transformations, enhancements and other operations known to those skilled in the art of image stitching images captured from unique perspectives and orientations.

The resulting panoramic image, as stitched by image processor 1363, is presented to the user of client device 1360 on the display of user request processor 1364. In the preferred embodiment, the format of this presentation is a video sequence. The user views a window onto the captured panoramic image. Over time, the window pans from one side of the panoramic image to an opposite side. The input device of user request processor 1364 allows for interactive panning of the panorama.

In another embodiment of the image capture system of this invention, the user of client device 1360 submits a GPS location via user request processor 1364, through network interface 1361. The GPS location is sent to network cameras via network 1350, and results in the generation of a panoramic image of the GPS location by network cameras 1300 and 1330. The process of capturing and stitching a panorama of this GPS location is possible in this embodiment by including network cameras comprising GPS sensors as, or supplemental to, their respective position sensors, or by including network cameras comprising relative position sensors calibrated to a fixed GPS location prior to entering their respective trajectories.

It is anticipated that the image processor 1363 may rotate or otherwise transform a pair of images generated by cameras 1300 and 1330 to any number of resulting orientations, scales and perspectives, while accomplishing the primary objective of stitching the two images along neighboring boundaries. The resulting orientation of a stitched output of image processor 1363 may be the orientation of one of the network cameras or an orientation of the subject of image capture relative to Earth.

It is anticipated that an edge of one image to be stitched to an edge of a second image may be inset from the edge of the raw image data generated by the network camera. It is also anticipated that two images may be neighbors without sharing an edge. To this degree, overlapping images or gaps between images may exist in the two images to be stitched. Overlapping image data may be resolved by selecting pixel data from one of two images, averaging pixels, or any number of means for stitching overlapping images understood to those skilled in the art of stitching, as well as those skilled in the art of image enhancements. The art of stitching two images teaches of techniques for stitching along non-linear boundaries, edge boundaries of common objects, patching gaps, and other restorative techniques that may facilitate the successful stitching of two images generated by network cameras.

Figure 14:
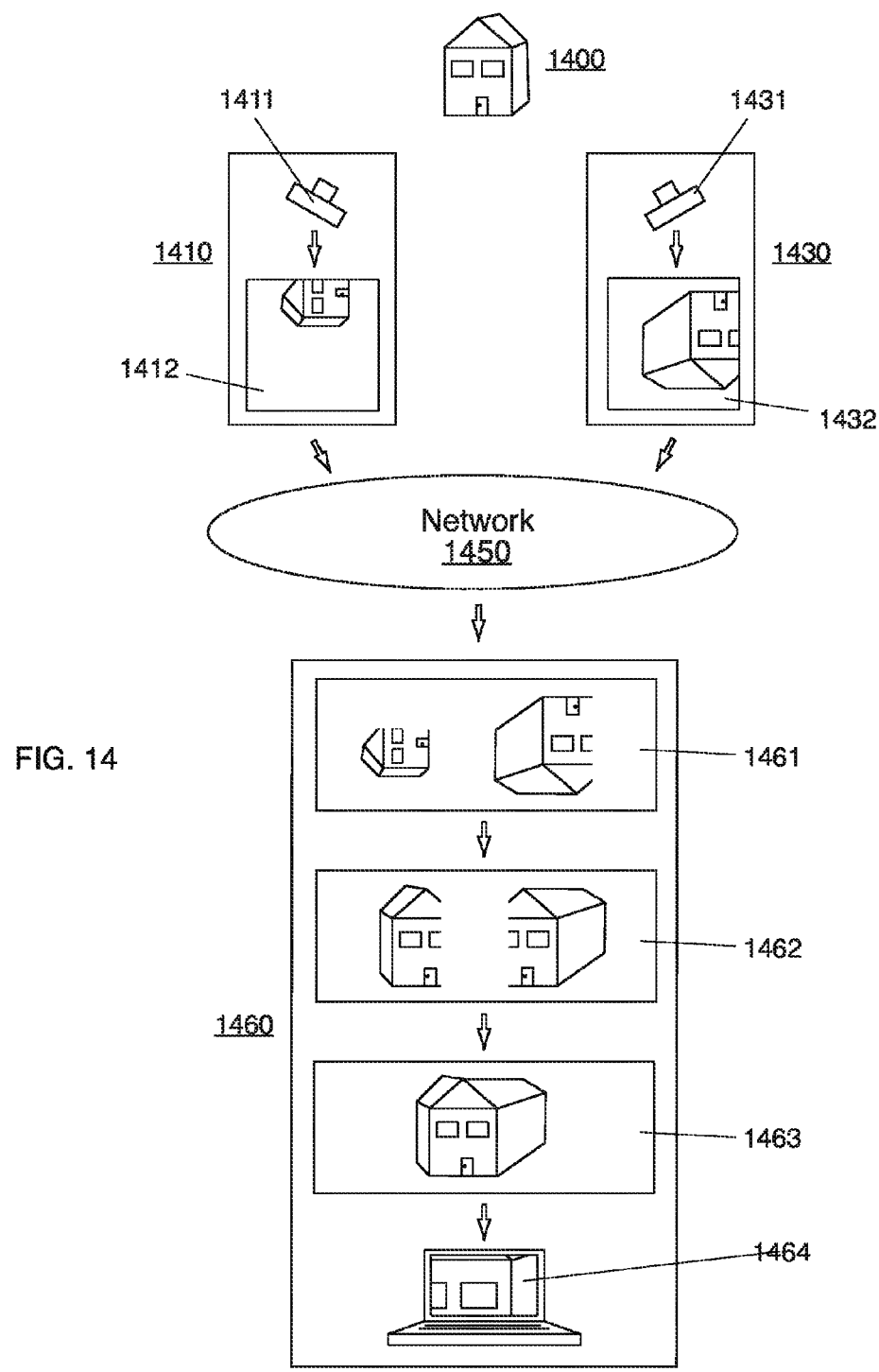
FIG. 14 illustrates an image capture system of this invention.

An embodiment of the image capture system as described in block diagram FIG. 13 is depicted in the illustration of FIG. 14. House 1400 is the desired subject of image capture, with the objective being to generate a panoramic image wrapping around both sides of the house. To achieve the objective, network cameras 1410 and 1430 are thrown into trajectories on either side of house 1400.

Network camera 1410 comprises camera 1411. Camera 1411 comprises an orientation sensor and a position sensor. In response to a signal from its orientation sensor and position sensor, camera 1411 captures image 1412, a partial view of house 1400. Network camera 1410 transmits image 1412 to client device 1460 over network 1450. Network camera 1410 also transmits the orientation and position of camera 1411 to client device 1460.

Second network camera 1430 comprises camera 1431. Camera 1431 comprises an orientation sensor and a position sensor. In response to a signal from its orientation sensor and position sensor, camera 1431 captures image 1432, a unique partial view of house 1400. Network camera 1430 transmits image 1432 to client device 1460 over network 1450. Network camera 1430 also transmits the orientation and position of camera 1431 to client device 1460.

As shown at 1461, images generated by the network cameras 1461 and 1461 are stored on client device 1461. Orientation and position data from the two respective network cameras are also stored on client device 1461. As shown at 1462, the image processor on the client device utilizes the respective orientation and position data to rotate and scale the images to make possible the stitching of neighboring edges, and to provide an output orientation representing the orientation of house 1400 relative to Earth below. In this application, the rotation angle applied is the inverse of the camera orientation at the time of image capture. Resulting images after rotation and scale operations are shown at 1462. The two images are stitched to produce seamless panoramic image 1463. A window onto seamless panorama 1463 is presented on a monitor of workstation 1464, allowing the user to pan around the house from one side to the other.

In another embodiment of the image capture network of this invention, a camera is directly connected to the memory of a client device, allowing the client device to serve both as a camera and as the processor of image data arriving from network cameras. In this embodiment, the camera, memory and processor for stitching images are contained within the same ball-shaped housing. In this configuration it is not necessary for the local camera to communicate via the network to store image data in the memory. It is anticipated in this embodiment that a hardwired connection between the local camera and a local memory is preferable over a wireless connection. Image data, orientation and position data generated by the local camera is stored in the memory while network cameras store image data in the same memory via the network. The stitching processor of the client device can thus stitch a locally captured image to an image generated by a network camera, as well as images generated exclusively by network cameras. The advantage of this embodiment is that it does not require a dedicated client device on the network.

The above embodiments and others described herein teach of two images stitched together to create a generally seamless larger image. As described, the stitching process is iterative in order to stitch the output of a stitching operation to another image. In this workflow, a large panorama may be stitched from a multitude of images arriving from network cameras. It is anticipated that a parallel processing unit comprising multiple stitching processors may be employed to stitch images generated by network cameras, each respective stitching processor completing a stitching task in parallel with another stitching processor completing a different stitching task. The outputs of the two stitching processors may be merged in a final stitching operation.

It is further anticipated that multiple client devices on the network, each having a respective stitching processor, may operate on separate sections of a larger panorama benefiting from distributed processing. The resulting stitched sections output from distributed stitching processors may be merged in a final step by one stitching processor into the final panoramic image. The network allows subsections of a panorama to be stitched on separate client devices, merged in a final operation on one client device.

Figure 15:
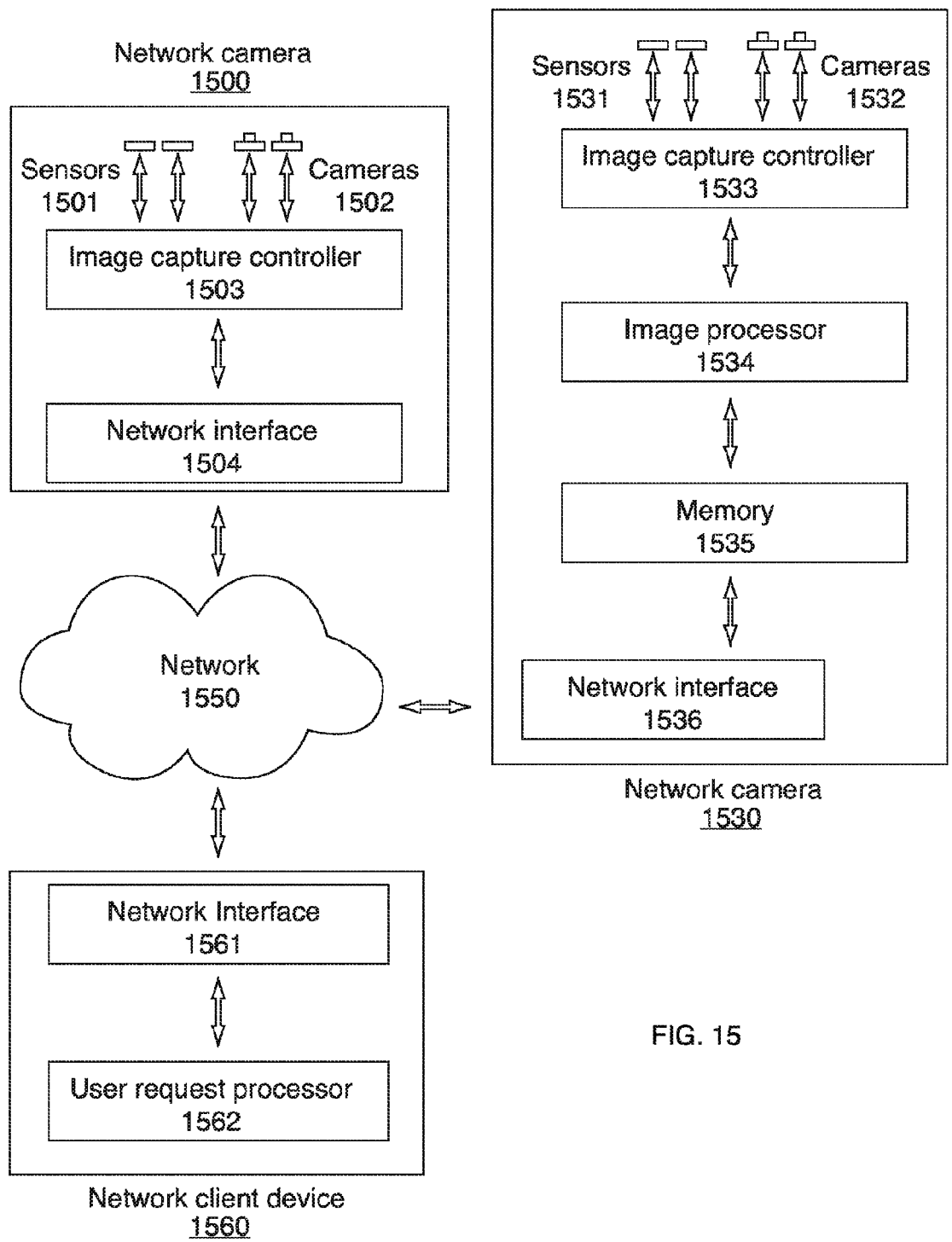
FIG. 15 is a block diagram illustrating the operation of an image capture system of this invention.

FIG. 15 is a block diagram depicting the operation of another embodiment of the image capture system of this invention. In the embodiment illustrated by this diagram, two types of network cameras exist on the network, a network camera that captures image data and another, more advanced network camera. Beyond capturing image data, the advanced network camera performs stitching and transformation operations on images generated by its own camera and at least one other network camera. The client device of this system provides the user with the ability to request images as well as to receive and view image data from network cameras.

Network camera 1500 is comprised of cameras 1502 connected to image capture controller 1503. Network camera 1500 further comprises orientation and position sensors 1501, to determine the orientation and position of network camera 1500 at the time of an image capture. Image capture controller 1503 reads sensor data, and triggers image capture. Network interface 1504 sends data to and receives data from devices connected to network 1550.

Network camera 1530 is comprised of cameras 1532 connected to image capture controller 1503. Network camera 1530 further comprises orientation and position sensors 1531, to determine the orientation and position of network camera 1530 at the time of an image capture. Image capture controller 1533 reads sensor data, and triggers image capture. Network camera 1530 further comprises image processor 1534, memory 1535 and network interface 1536.

User request processor 1562 of client device 1560 allows a user to provide instructions to network devices via network interface 1561. User request processor 1562 also manages the display of image and video data generated by network devices.

In operation, image capture controller 1503 triggers at least one of network cameras 1502 to capture an image in response to a signal from sensors 1501. The captured image is transmitted by network interface 1504 on network 1550 to be received by network interface 1536 and stored in memory 1535. Along with the image data, network camera 1500 transmits the orientation and position of the camera capturing the image.

Image capture controller 1533 triggers at least one of network cameras 1532 to capture an image in response to a signal from sensors 1531. The captured image is stored in memory 1535.

Image processor 1534 performs image transformation and stitching functions on the image generated by one of cameras 1532 and the image generated by one of cameras 1502, in order to produce a larger image of a desired subject of image capture. The process is repeated iteratively to produce a large panoramic image. The panoramic image is transmitted to client device 1560 for access by the user.

The advantage of having a network camera manage processing of data sourced from a plurality of camera balls is that the processing can occur in the field of operation, rather than at the site of the client device. This allows, for example, a significant amount of duplicative data to be discarded during a field operation rather than being stored in memory for return to the site of the client device. Another advantage of having a camera ball advantaged with processing and memory is that camera balls can perform distributed processing operations on a network with a single client device. Multiple network cameras can thus perform stitching operations to create stitched subsections of a larger panoramic image, the network cameras providing completed subsections to a single network camera for a final stitching operation, in advance of transmission of the complete panoramic image to a client device.

In another embodiment, network camera balls as well as a client device each include respective processors and memory sufficient to perform local operations as well as collaborative operations. A workflow utilized by such an image capture system is illustrated by example in FIG. 16. In the exemplary application of this workflow, the user of workstation is provided with a panoramic view wrapping around two sides of house 1600.

Figure 16:
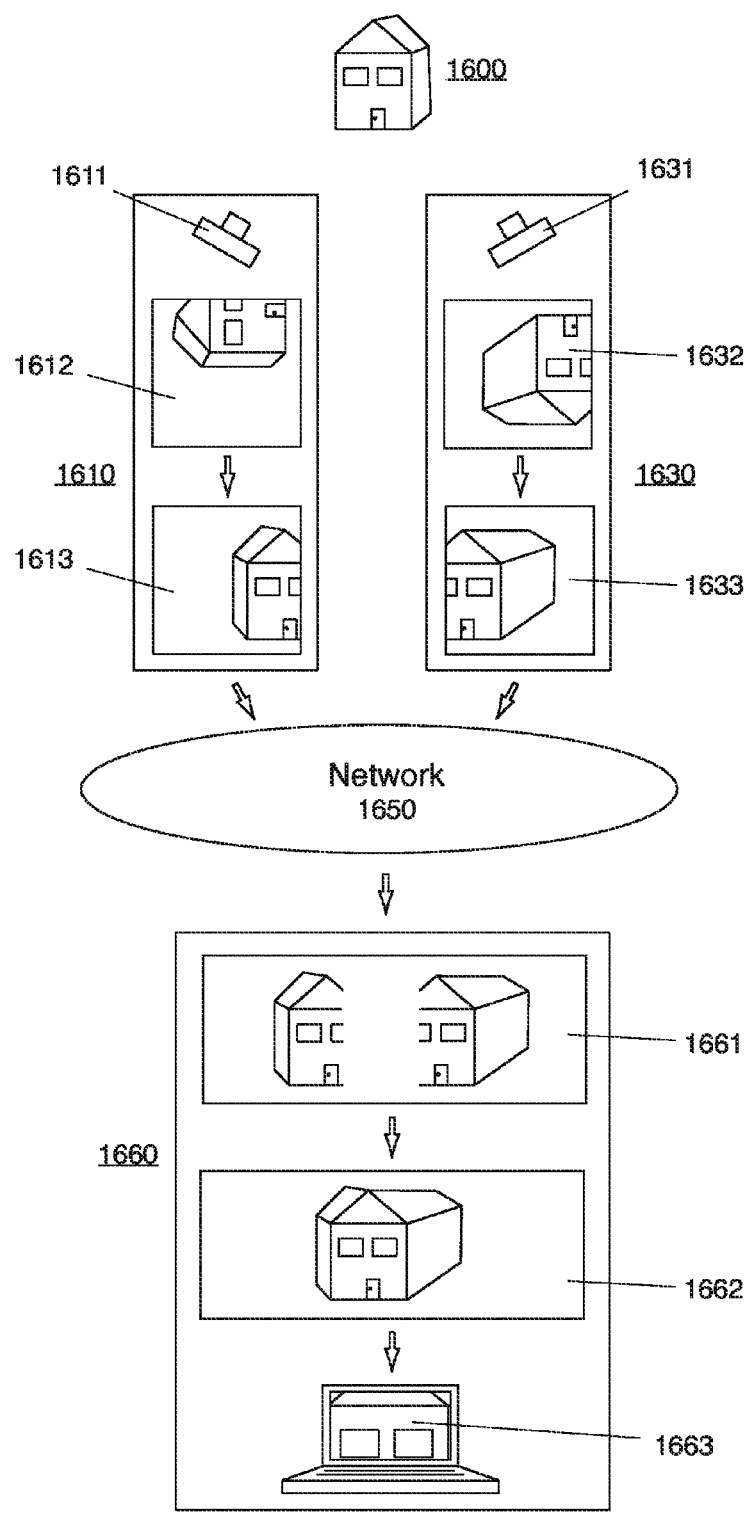
FIG. 16 is an illustration of the image capture system of this invention having image processing functions on multiple network devices.

An embodiment of the image capture system of this invention is illustrated in FIG. 16, differing in operation from the embodiment of FIG. 14 in that network cameras 1610 and 1630 each comprise a camera, an image processor and memory necessary to image rotation operations on respective, captured images. Camera 1610 rotates captured image 1612 to orientation 1613 in response to a signal from an orientation sensor on camera 1610. As shown, the orientation angle applied during the rotation is an inverse of the orientation of camera 1610 and resulting image 1613 reflects the orientation of house 1600. Independently of camera 1610, camera 1630 rotates captured image 1632 to orientation 1633 in response to a signal from an orientation sensor on camera 1630. The orientation angle applied during the rotation is an inverse of the orientation of camera 1630 and resulting image 1633, matching the orientation of image 1613, reflects the orientation of house 1600.

Because cameras 1610 and 1630 are equipped with capabilities for transforming captured images, client device 1660 is not required to perform the rotation operation described for client device 1460 in FIG. 14, since the rotation has been completed for each image by respective network cameras 1610 and 1630 at respective steps 1613 and 1633. Client device 1660 comprises a processor and memory suitable for stitching images 1661 generated by network cameras. Resulting panorama 1662 is displayed on computer monitor 1663 of client device 1660.

In another embodiment of the image capture system of this invention, network devices include a plurality of network cameras, each having a ball-shaped housing for throwing or projecting into an airborne trajectory. The cameras are each comprised of an orientation sensor and a position sensor that determines the orientation and position of the respective camera along its trajectory. The network also includes a client device having a memory for receiving and storing images, orientation and position data generated by the network cameras. The client device also has an image processor for rotating the images generated by the network cameras to an orientation in the same coordinate system.

In this embodiment, the resulting orientation of images generated by each network camera is one in which the orientation of the subject of image capture is not biased by the camera orientation of the respective network camera capturing the image.

In this embodiment, the rotated images generated by network cameras are compiled as video frames, ordered in sequence as a video. Persistence of vision enables the frames to be viewed by a user as an animated, generally seamless transition from the point of view of one network camera to another. Because the relationship of the network cameras to the subject of image capture is critical to the ordering of frames in the video, the position data is used to determine which image is the next in the transition. It is anticipated that the ordering of video frames will be derived from the order of cameras in their position relative to each other, however other position-based sequences may present advantages.

An example of this embodiment is described earlier and illustrated in FIG. 12. As described, images generated by network cameras 1201, 1202, 1203 and 1204 have been rotated and scaled to produce respective moving picture frames 1251, 1252, 1253 and 1254. The order of frames is derived from the position of the cameras relative to each other around subject 1210. In other words, the close proximity of camera 1201 to camera 1202, by comparison with the distance between camera 1201 and camera 1203 determines that image frame 1251 should be followed in sequence by image frame 1252, followed by image frame 1253.

It is anticipated that proximity to a subject of interest, in this example subject 1210, also may help determine the order of frames in a video sequence. For example, if there are two cameras equidistant from camera 1201, the camera closer to subject 1210 might be preferred.

Just as image processor 1363 in FIG. 13 is described herein as utilizing camera orientation in the process of rotating and stitching neighboring images, it is possible for a client device similar to 1360 in FIG. 13, to comprise a video image processor that utilizes camera position data generated by network cameras to determine the order of a sequence of video frames, providing a video in the workflow rather than a stitched panorama.

For illustrative purposes in FIG. 12, animated moving picture sequence 1250 resembles a 35 mm filmstrip commonly presented with a movie projector, a technology depending on persistence of vision to create the illusion of seamless motion.

The individual moving picture frames as illustrated in moving picture segment 1250 could alternatively have been formatted as video frames by those skilled in the art of animation and video production. The resulting video, when viewed as a sequence of frames, would similarly present an animated tracking shot around subject 1210. Persistence of vision creates the illusion of a seamless transition around subject 1210. The point of view from of a succession of network cameras simulates the movement of a single camera around the subject.

In another embodiment of the image capture system of this invention, a master network camera controls the operation of a slave network camera, generating instructions communicated wirelessly over a network. In this embodiment, network cameras each include an orientation sensor and a position sensor to determine the orientation and position of each respective camera over the course of its trajectory. The master camera further comprises a sensor that signals an event, such as the presence of a subject of interest. In response to a signal from its event sensor, the master camera sends a capture instruction to the slave camera. The instruction includes orientation and position data to indicate the location of the subject of interest.

Upon receiving a capture instruction, the slave camera determines if it is in an orientation and position capable of capturing an image of the subject of interest. Upon such a determination, the slave camera captures an image.

An embodiment of the image capture system comprising a master network camera and a slave network camera is depicted in FIG. 17. As shown, two network camera balls are thrown into a trajectory around person 1740. Housed within master camera 1700 are cameras 1701, 1702 and 1703, motion sensors 1704, 1705 and 1706, orientation sensor 1707 and position sensor 1708. Housed within slave network camera 1750 are cameras 1751, 1752 and 1753, motion sensors 1754, 1755 and 1756, orientation sensor 1757 and position sensor 1758. Both cameras communicate wirelessly on network 1720.

In operation, slave camera 1750 detects an external motion at motion sensor 1756 as a result of a movement by person 1740. In response to the signal from motion sensor 1756, slave camera 1750 sends a message to master camera 1700 including position and orientation of camera 1753. Slave camera waits for a command.

In response to the message from slave camera 1750, master camera 1700 approximates its spatial relationship to person 1750 using the position and orientation data provided by slave camera 1750 as well as pre-existing data such as the generally known sensitivity range of motion sensors. With additional data derived from orientation sensor 1707 and position sensor 1708, master camera 1700 is thereby able to determine that at least a portion of person 1740 is presently in view of local camera 1701 and remote camera 1753.

Upon its determination, master camera 1700 disables cameras 1702 and 1703 and instructs camera 1701 to begin video capture. Master camera 1700 sends a message to slave camera 1750 requesting the disabling of cameras 1751 and 1752 and the capture of video from camera 1753. By monitoring its orientation and position as well as receiving orientation and position updates from slave camera 1750, master camera 1760 can ensure that video captures and single image captures contain a portion of person 1740.

As described, camera 1701 captures a video, an example frame of which is illustrated at 1770. Camera 1753 captures a video, a frame of which is illustrated at 1780. Because orientation and position information is available for all respective frames in these videos, it is possible to use techniques described in this specification, such as illustrated in FIG. 12, to construct a meaningful video sequence compiled from video images from the two cameras. Earlier techniques described herein describe methods to produce images and video panoramas (also known in the art as wide-angle or wide field of view), spherical panoramas and complex image geometries known to those skilled in the art of processing images generated by multiple cameras.

It is anticipated that information from sensors on a slave network camera, for example distance to a subject determined by a range-finder, or for example environmental conditions such as the presence of fog or smoke, may be transmitted to a master network camera. Information from remote proximity sensors advantages the master camera, for example by using remote proximity sensor data to improve accuracy in refining the location of a subject of interest. Information received from atmospheric sensors, such as smoke or fog detectors, provides the master camera with the potential to activate LEDs on slave cameras to illuminate particular wavelengths of light capable of improving visibility.

Nothing described herein with respect to master or slave cameras should be construed as a limitation of the master or slave camera to function independently, without respect to an active master-slave relationship. For example, while continuing to use its orientation and position sensors to capture image and video data along its trajectory, a network camera can perform functions as a slave, responding to instructions from a master camera on the network.

Messages sent between master and slave cameras may contain one or more instructions, and supplemental data.

One possible network instruction is an authorization of a master camera. Another possible instruction is the authorization of a slave camera. For example, a first network camera may send an instruction to a second network camera to request that the second camera act as a slave camera. Receiving confirmation from the newly authorized slave camera, the first network camera thereupon acts as a master camera, sending instructions including commands to the slave camera. In another example, a client device may instruct a camera to act as a master camera, the newly authorized master camera instructing other network cameras of their new authorization as slave cameras. In another example, a camera may assign itself the role of a master camera in response to a signal from a sensor, instructing and confirming that other cameras on the network are newly authorized as slave cameras.

Another possible instruction forces an image capture, whereby a master camera directs a slave camera to capture an image or video regardless of the slave camera's state, orientation or position.

Another instruction is a reset, whereby the master camera directs a slave camera to reset to a predetermined state.

Another instruction from the master camera causes slave cameras to cast light on a subject of interest, or illuminate the immediate area around the slave camera.

Event sensors anticipated include but are not limited to orientation sensors, position sensors, motion sensors, range-finders, proximity sensors, audio sensors, microphones, light sensors, infrared sensors, vibration sensors, oxygen sensors, co sensors, co2 sensors, hydrogen cyanide sensors, pressure sensors, altitude sensors and temperature sensors. It is anticipated that object recognition technology capable of identifying a subject of interest may be employed as an event sensor.

Gyroscopic Stabilization

As described earlier in this specification, a camera ball may be weighted to introduce gyroscopic stability when spun into a trajectory. Such a weighted ball is particularly important for network cameras. Network cameras, communicating wirelessly to a client, do not require a physical retrieval of a thrown ball to access image data and therefore are well-suited to being thrown or projected long distances. When thrown or projected over long distances, efficiencies in image data generation such as a reduction in redundant data from cameras with overlapping fields of view, are valuable in conserving resources such as memory or network bandwidth available for data transmission.

A number of aerodynamic advantages of weighted camera balls, including balls with dynamically controlled weights and gyroscopes having angular force around a desired axis of rotation, are described earlier in this specification. Among them, the use of a weight to in a spinning ball to act as a gyroscope assists an airborne camera in overcoming external forces acting on the housing, such as aerodynamic force of wind.

Generating a large angular momentum around a desired axis of rotation advantages a ball camera in a number of ways. Two cameras having respective apertures spinning around the axis of rotation, each on a plane perpendicular to the axis of rotation, each camera viewing a direction opposite from the other, are able to capture distinctly separate image swaths without the possibility of capturing overlapping portions of the exterior environment. In this regard, the total number of cameras within a single housing can be minimized by ensuring that each camera is orbiting around an axis of rotation with a unique view to the external environment so that the cameras together capture an entire spherical scene with minimal image data redundancy.

Another advantage in having a stable orbit around an axis of rotation is in the use of camera lenses optically advantaged by having a particular alignment. For example it is preferable to capture a subject of interest generally centered on a spinning fisheye lens than a subject of interest captured only at the periphery of a spinning fisheye lens. Similarly, it is preferable to capture a subject of interest centered on a spinning fisheye lens than a subject of interest repeatedly passing across a spinning fisheye lens, from its periphery through its center.

A disc or wheel stabilizes a gyroscope by producing a large angular momentum around the axis of rotation, with the angular force forcing the mass of the ball away from the center of mass, perpendicular to the axis of rotation. At minimum, for the purposes of stabilizing cameras, one or more weights can be fixed to a camera housing so that the mass of the ball is equally distributed around its desired axis of rotation.

The user of the camera ball accelerates the ball into a spin when the ball is pitched. It is necessary for the user of the ball to be aware of the location of an embedded disc or wheel, if the mass of the disc or wheel is to act as a gyroscope when accelerated into a rapid spin during the pitch of the ball.

An embodiment of the weighted ball of this invention is shown in FIG. 18. Camera ball 1800 is represented in cross-sectional side view 1810 and cross-sectional front view 1830. Camera 1800 has aperture 1801. Indentation 1802 advantages the camera ball in a number of ways. For one, by laying a finger on the indentation, the user can easily determine the position and orientation of a mass in the housing. Indentation 1802 also advantages the user by allowing a single finger to pull the ball into a spin, necessary to create a gyroscopic force while eliminating the possibility of the finger slipping along the housing when pitched into its trajectory. Indention 1802 also advantages the ball camera by providing an access point for a switch triggered by the touch of a single finger for, as an example, powering the ball on or off.

An embodiment of the camera of this invention comprises a housing with a concave indentation, as exampled at 1802 in FIG. 18, that aligns the user's finger on the surface of the housing in such a way as to introduce a spin when the ball is pitched so the ball spins around the desired axis of rotation. The indentation may be as small as a dimple or as large as a thimble-sized recession capable of containing the entire first joint of the user's index finger.

An embodiment of the camera of this invention comprises a housing with a convex perturbation, as described earlier, that aligns the user's finger on the surface of the housing in such a way as to introduce a spin when the ball is pitched so the ball spins around the desired axis of rotation. The perturbation may be as small as a pimple, or may be a group of pimple-like bumps.

An embodiment of the camera ball of this invention combines the finger alignment deformation on the housing, either an indentation or a perturbation as described, working in combination with the gyroscopic stability-inducing mass also as described, its mass distributed around the axis of rotation to generate angular momentum when the finger spins the ball into its trajectory.

For camera balls requiring a one-finger pitch, the finger alignment indentation or perturbation is located on the ball's exterior surface, substantially close to any point on a plane perpendicular to the axis of rotation containing a point on the exterior surface of ball farthest from the axis of rotation. The objective of the finger location, away from the axis of rotation, is to maximize acceleration into a spin by a single finger. An example of such an embodiment is the ball camera of FIG. 18.

A spinning camera ball benefits from having a camera aperture centered on the axis of rotation, on a plane perpendicular to the axis of rotation, with an outwardly-facing view along the axis of rotation. Such a position and orientation allows a subject of image capture to remain centrally located within the aperture while the ball is spinning. A single orientation sensor determining the orientation of the axis of rotation is suitable for image and video data captured by this camera to be rotated to an inverse of the aperture orientation at the time of capture, in order to remove spin and produce a video with spin eliminated.

An embodiment of the camera of this invention comprises the weight described earlier, distributed around the axis of rotation to generate angular momentum. The embodiment further comprises a camera aperture centered on the axis of rotation, on a plane perpendicular to the axis of rotation, and with an outwardly-facing view along the axis of rotation. An example of this embodiment is illustrated by the camera of FIG. 18.

Another embodiment of the camera ball of this invention has two camera apertures. Each aperture is centered on the axis of rotation, each on a plane perpendicular to the axis of rotation, one aperture facing outwardly at the opposite side of the camera ball from the other aperture. Such a configuration is further advantaged by having a mass, as described earlier, to generate angular momentum around the axis of rotation. Such an embodiment is also advantaged by having a dimple or perturbation on its housing to locate a finger or fingers in order to produce angular momentum around the axis of rotation.

An embodiment of the camera ball of this invention, capable of capturing a spherical panorama at any point in its trajectory, has two cameras. Each camera of this embodiment has an aperture with a field of view approaching 180 degrees in all directions; each aperture centered on the axis of rotation; each aperture on a plane perpendicular to the axis of rotation; a first aperture viewing outwardly along the axis of rotation; the second aperture viewing outwardly along the axis of rotation, in the opposite direction from the first aperture. A single orientation sensor aligned along the orientation of the axis of rotation, thereby determining the orientation of both apertures, is sufficient in this embodiment to allow for the rotation of images captured through either aperture, in order to produce images and video frames each aligned in orientation to the subject of image capture. Such a camera ball is further advantaged by having a mass, as described earlier, to generate angular momentum around the axis of rotation. Such a camera ball is also further advantaged by having a dimple or perturbation on its housing, as described earlier, to locate a finger or fingers in order to produce angular momentum around the axis of rotation.

Figure 19:
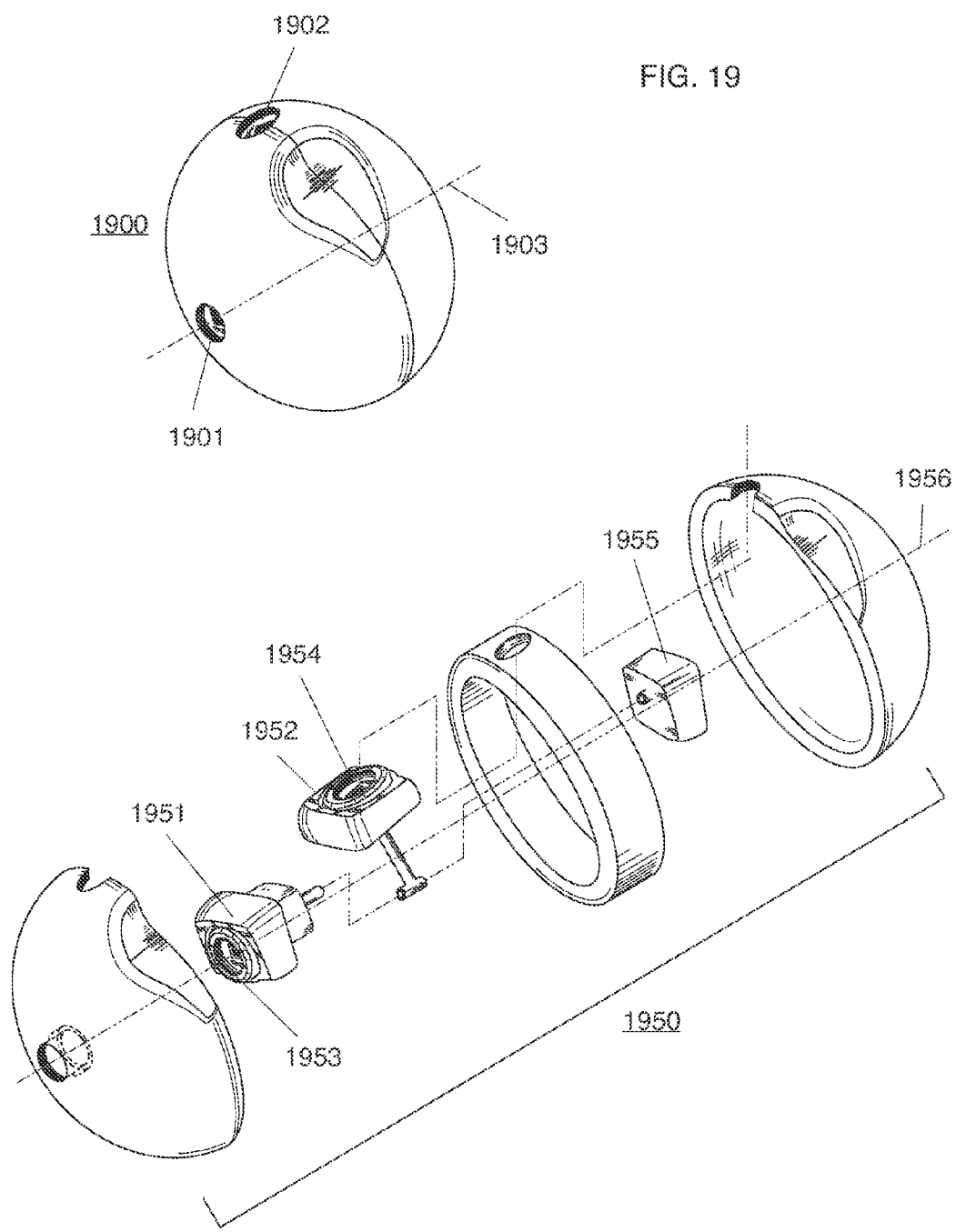
FIG. 19 shows an exploded view of an example throwable camera.
Figure 20:
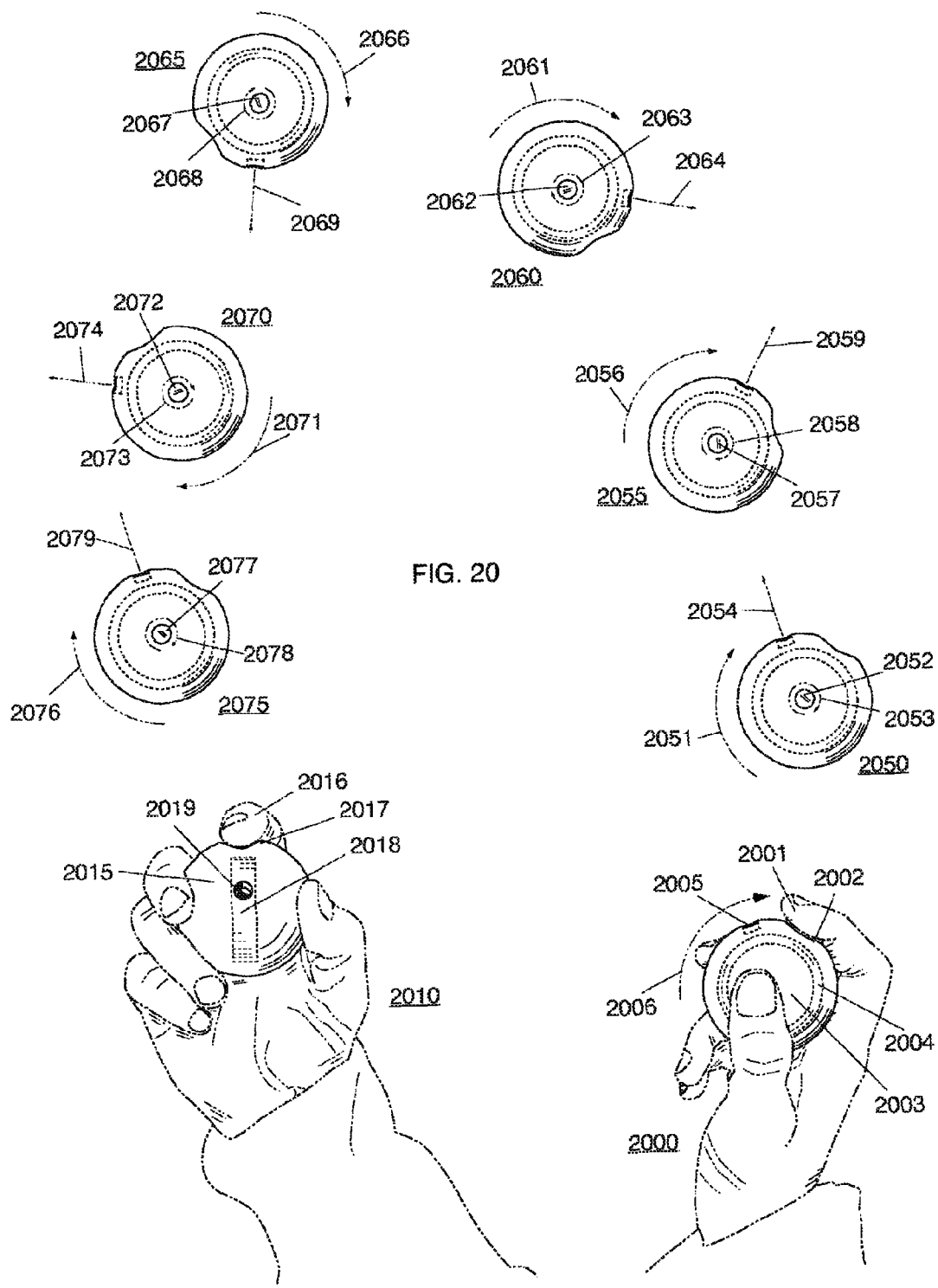
FIG. 20 shows a throwable camera in operation as it moves along its trajectory.

An embodiment of the camera ball of this invention is illustrated by example in FIGS. 19 and 20. The camera ball of this embodiment contains three cameras. Two camera apertures are located on the housing, each centered on the axis of rotation, each on a plane perpendicular to the axis of rotation, the two apertures facing outwardly along the axis of rotation from opposite sides of the ball. In such a configuration, the two respective subjects of image capture presented to each of the two apertures while the ball is spinning remain generally centered within the respective fields of view over the entire trajectory, providing all the advantages described earlier for apertures centered on and perpendicular to the axis of rotation. In this embodiment, a third camera aperture is on the camera ball's housing on a plane parallel to the axis of rotation. Such an aperture orientation relative to the axis of rotation enables this third camera to have a field of view existing between the respective fields of view of the two cameras facing outwardly in opposite directions along the axis of rotation, thereby enabling, for example, three cameras each with a 90 degree field of view to capture a full spherical panorama in every revolution around the axis of rotation. Such a camera ball may be further advantaged by having a dimple or perturbation on its housing to locate a finger in order to produce angular momentum around the axis of rotation.

Cross-sectional views into the interior of camera ball 1800, shown at 1810 and 1830, reveal that weighted wheel-shaped mass 1812 and 1832 exists within housing 1811 and 1831. The wheel and the housing are fused, glued or otherwise bonded so that they are spun together. It is anticipated that this wheel will be manufactured using metal or other dense material.

Camera aperture 1801, also shown at 1815 and 1836, is centered on the axis of rotation, on a plane perpendicular to the axis of rotation, viewing outwardly along the axis of rotation. As described in earlier embodiments of the ball camera of this invention, an aperture located on the axis of rotation presents the camera with a spinning view along a trajectory, without the center of the aperture having to travel a spiraling path or circular orbit as the ball moves through it trajectory. The subject of image capture remains generally centered in the field of view, spinning around the axis of rotation. Image and video frames captured from cameras with such aperture configurations can be rotated to the orientation of the subject of image capture by applying the inverse of the orientation of the axis of rotation at the time of image capture, thus only requiring a 1-axis orientation sensor on the axis of rotation.

Camera ball 1800 has finger indentation 1802, also shown in cross-sectional views at 1813 and at 1833. As described earlier, indentation 1813 and 1833 aligns finger 1814 and 1834 with mass 1812 and 1832 around axis of rotation. The purpose of the indentation is to help locate the finger on the ball in order to provide a mechanical advantage to the finger, during a pitch, so that spin on the ball is accelerated around the axis of rotation, the spin direction indicated by arrow 1816. The axis of rotation of camera ball 1800, and cross-sectional views 1810 and 1830, is shown at 1835, with the desired spin direction around the axis of rotation shown at 1803 and 1816.

An example of a camera ball having one or more perturbations to align the user's finger are shown in side cross-sectional view 1850 and in front-facing cross-sectional view 1860. Two perturbations at 1851, also shown at 1861, align finger 1852, also shown at 1862, with mass 1853 and 1863. This alignment locates the user's finger necessary for producing the desired angular momentum around axis of rotation 1864, and also provides a mechanical advantage in producing the spin.

Figure 21:
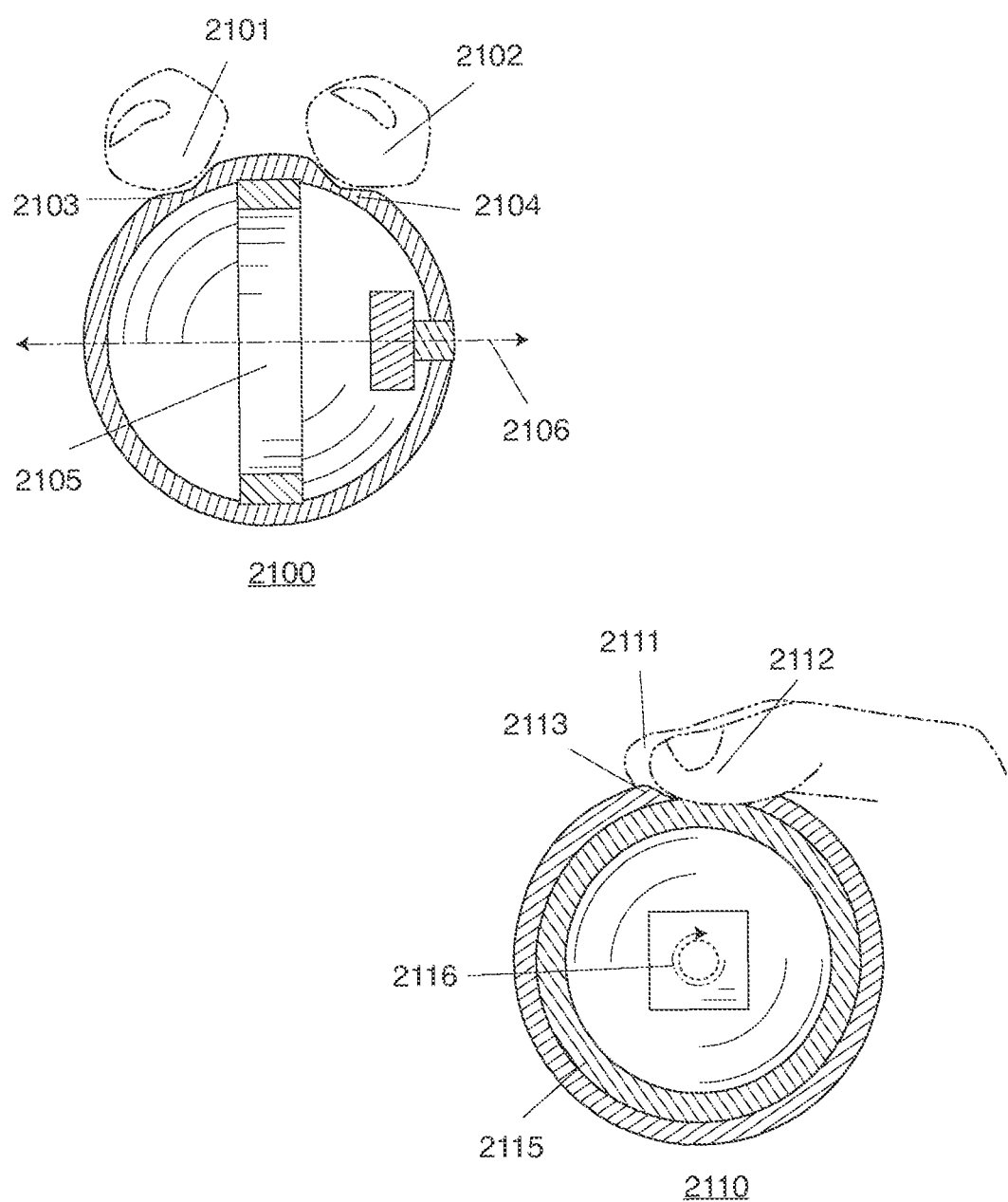
FIG. 21 is an illustration of a camera ball having a two-finger indentation for aligning the user's hand with the axis of rotation.

For camera balls requiring a two-finger pitch, an embodiment of the ball of this invention has two indentations or two sets of perturbations to align and index and a middle finger in order to spin a mass around a desired axis of rotation. As shown in front view 2100 of FIG. 21 and side view 2110, finger alignment indentations 2103 and 2104, also shown at 2113, are located on the housing on either side of mass 2105 and 2115. The advantage of mass 2105 and 2115 is described earlier this specification. Mass 2105 and 2115 is distributed around axis of rotation 2106. The mass is accelerated by fingers 2101 and 2102 into a rapid spin around the axis of rotation as represented by arrow 2116 during a pitch to generate angular momentum around the axis of rotation. The two indentations of this embodiment help to align the two fingers, and also provide mechanical advantage in allowing the fingers to put a spin on the ball without slipping along the housing.

Another embodiment of a two-finger camera ball comprises one or more closely grouped perturbations on the surface of the ball, one group for each of two finger alignment locations. The locations of the two groups of perturbations are identical to locations of the indentations 2103 and 2113 of FIG. 21. The two groups of perturbations replace the example indentations of FIG. 21 while providing the same advantages in aligning each of the two fingers and providing mechanical advantage when the ball is spun into its trajectory. An example shape of a group of two perturbations is shown for a single finger at 1850 and 1860 in FIG. 18.

The camera of FIG. 19 illustrates the assembly of a camera ball containing a mass capable of generating angular momentum around an axis of rotation; and an indentation for aligning and providing mechanical advantage to a user's finger; and three cameras, together capable of producing a spherical panorama in any complete revolution around the axis of rotation. The camera of FIG. 19 is shown assembled at 1900 and in exploded view 1950. Cameras 1901 and 1902 are represented in exploded view 1950 by respective cameras 1951 and 1952. Camera 1951 has aperture 1953. A third camera not seen at 1900, camera 1955, has an aperture, not shown. Aperture 1953 and the aperture of camera 1955 are both centered on axis of rotation 1956 and viewing outwardly in opposite directions, each on a plane perpendicular to the axis of rotation. Camera 1952 is positioned within the housing with its aperture 1954 on a plane parallel to the axis of rotation, thus enabling the camera, when spun around the axis of rotation, to capture image data between the respective fields of view of spinning cameras 1953 and 1956.

A ball-shaped camera, with its housing and components distributed around an axis of rotation, is capable of generating angular momentum necessary to act as a gyroscope for the stabilization of the camera without requiring the addition of a dedicated mass for increasing angular momentum. Given that a camera with a spherical housing, by definition, has a symmetric housing and a mass of components easily distributed around an axis of rotation, a ball camera is ideal for producing gyroscopic stability. For this reason, improvements such as a finger indentation to orient the finger relative to an axis of revolution, and to provide the finger with mechanical advantage entering the ball into a spin, and other improvements such as having a camera aperture located on the housing according to an axis of rotation, can all be considered improvements for many spherical (or substantially spherical) camera balls, those with and those without a dedicated mass added for generating angular momentum.

FIG. 20 presents a view of a gyroscopically stabilized camera ball in operation, with an illustrated representation of its spin around the ball's axis of rotation, shown at various positions along its trajectory. The ball of this example contains three cameras. The camera ball as ideally held in the hand of its user is illustrated in side view 2000 and front view 2010. Camera ball 2003 is shown over time as it spins through its trajectory with successive locations at 2050, 2055, 2060, 2065, 2070 and 2075.

User 2000 accelerates camera ball 2003 and 2015 into a spin by placing tip of finger 2001 and 2016 into indentation 2002 and 2017. Indentation 2002 and 2017 aligns the finger with mass 2004 and 2018 so that spin put on the ball when pitched uses the mass to generate substantial angular momentum around the axis of rotation, the spin represented by arrow 2006, and subsequently through the ball's trajectory at spin direction arrows 2051, 2056, 2061, 2066, 2071 and 2076. Camera ball 2003 has three cameras and respective apertures, two of the apertures centered on the axis of rotation, on respective planes perpendicular to the axis of rotation. One of these two apertures is shown at 2052, 2057, 2062, 2067, 2072 and 2077, centered on the axis of rotation, and spinning on a plane perpendicular to the axis of rotation, with spin direction represented by arrows 2053, 2058, 2063, 2068, 2073 and 2078. The second camera and its aperture are on the opposite side of the ball from aperture 2052, with its aperture centered on the axis of rotation and on a plane perpendicular to the axis of rotation, facing in the opposite direction from camera aperture 2052. A third camera, with an aperture 2005 and 2019 parallel to the axis of rotation, has a field of view facing outwardly along a vector perpendicular to the axis of rotation as represented by arrows 2054, 2059, 2064, 2069, 2074 and 2079.

Aperture Position Data

When an image is captured by a camera ball having multiple apertures, the orientation data and position data necessary to transform the image are that of the aperture through which the image was captured. A single orientation and position does not define the orientations and positions of all apertures of the camera ball. For camera balls (e.g. housings) having apertures in fixed positions, wherein the aperture configuration is known to the camera's processing unit, a single orientation sensor and a single position sensor fixed to the camera is sufficient for the processor to determine the position and orientation of an image captured by any aperture on the housing. It is also possible for the camera to store a single orientation and position to represent all images captured from all apertures at a simultaneous moment in time.

In this regard, it is possible for a network camera ball to send a plurality of image, a single orientation and a single position to a network device, as long as the network device is aware of the physical configuration of apertures through which the respective images were captured. For example, a camera ball can capture a plurality of images necessary to produce a spherical panorama; send the plurality of images in a pre-defined order along with an orientation value and a position value to a client device; and, with this data, the client device has the information necessary to proceed with stitching the images into a spherical panorama and also orienting the resulting spherical panorama with Earth below and sky above.

In fact, a client device with knowledge of aperture locations and a predefined order for receiving images can stitch a plurality of images received from a network camera with no orientation data or position data whatsoever.

For reasons outlined, an image capture systems having a plurality of cameras may be advantaged by camera housings having identical housings and aperture locations. In this manner, a client device is able to process arriving an multitude of simultaneous image captures from all apertures of any single ball, while being provided only one orientation value and one position value applicable to each image in the group of images.

It is anticipated that cameras having varying aperture configurations may be used on the same image capture system. In one embodiment of such a system, every image capture sent to a client device for transformation is accompanied by orientation and position data. Other configurations are anticipated. For example, the aperture orientations and apertures positions for each camera ball relative to a fixed point on a network camera may be sent to a client device in advance of image data, allowing the client device to apply transformations to a plurality of images captured from all apertures while receiving only a single orientation value and a single position value from the network camera for entire plurality. Network cameras may vary in the number of apertures on any one housing. The configuration of apertures provided to a client device may include the number of apertures, the size apertures, the diameter of the housing and other information helpful in reducing the amount of data required during subsequent image capture operations.

Just as it is anticipated an image camera system may include cameras having varying aperture characteristics, it is anticipated that camera balls on the same network may have any number of varying characteristics, complicating stitching and other collaborative processing operations. It is anticipated that prior to receiving an image stream, a client device will receive configuration information from network cameras that defines a number of characteristics necessary for the client to complete an efficient operation. Configuration data may include light gathering capability of each aperture, focal length, sensitivity to a particular range of electromagnetic radiation, lens filters, polarization, speed, pixel resolution and aspect ratio. Battery power may be provided by a slave camera to a master camera to initiate conservation operations, such as a decision by the master camera to temporarily disable the slave camera.

It is anticipated that video data received by a client device from a network camera ball may be accompanied by configuration information necessary to integrate video data from other network cameras. For example, in advance of receiving a video data stream, a client device may be instructed that the network camera is capturing at a specific frame rate. As another example, a master camera may instruct slave cameras to synchronize to a common frame rate such as 30 FPS. Because cameras likely to be deployed as throwable cameras use higher frame rates, such frame rate synchronization minimizes the capture of large amounts of unnecessary data during a grading operation.

It is anticipated that camera housings of various shapes and sizes may benefit from improvements described herein, and may operative collaboratively on a network along with ball-shaped cameras. The camera of this invention, with a ball-shaped housing capable of being thrown or projected into an airborne trajectory, is advantaged over other shapes and sizes for a variety of applications, as described.

In an earlier description of the trajectory trigger, photocells or photodiodes determine a camera ball's orientation relative to the sky. It is anticipated that light sensitive sensors known to one skilled in the art, such as an imaging sensor, phototransistor or camera may be used as an alternative to a photocell or photodiode to determine camera orientation by measuring contrasts between earth and sky.

A throwable camera is advantaged by the ability to be thrown or projected through multiple trajectories for the purpose of capturing swaths of image data for stitching or compositing into a representation of a larger environment than available from a single trajectory. In one embodiment of the camera of this invention, the camera remains powered over the course of being thrown into a series of trajectories, entering a sleep mode at the resting phase between trajectories to conserve power.

It is anticipated that the throwable camera network may be used for the transmission of data containing information pertinent to image capture as well as data unrelated to image capture. It is anticipated that environmental sensors communicating over the network include, but are not limited to orientation sensors, position sensors, motion sensors, rangefinders, proximity sensors, audio sensors, microphones, light sensors, infrared sensors, vibration sensors, oxygen sensors, co sensors, co2 sensors, hydrogen cyanide sensors, pressure sensors, altitude sensors and temperature sensors. Sensors may be included on camera balls or on a camera network for the purpose of collecting supplemental data. Sensors and network devices may derive an advantage from accessing image data made available on the network by throwable camera balls.

It is anticipated that all network devices including network cameras, network sensors, network storage media, network processors and client devices may require local storage for internal operations including but not limited to RAM, flash storage and magnetic media. It is further anticipated that network memory such as a file server may be used for temporary storage as well as archival storage of image data generated by network cameras. Archives of stored image data available on the network may be used for purposes including but not limited to pattern matching, SLAM, navigation, patching of gaps in panoramas, CGI, matte painting, etc.

The phrases "common coordinate system," "shared coordinate system" and "uniform coordinate system" used in this specification should be understood to mean two or more coordinate systems that allow for, however crudely, multiple images in their respective coordinate systems to be stitched together, compared, overlapped, layered, manipulated or otherwise considered as part of the same coordinate system. The spatial transformation necessary for one image to be stitched, for example, to another image may be a rough approximation, or it may be refined, as would be known to those skilled in the art of stitching images from multiple sources. It is anticipated that refinements to these transformations are possible. For example, the distance between two cameras and a subject of interest may be crudely calculated using orientation and position sensors fixed to each camera, utilized in a scaling of the subject of one image to more closely match the scale of the same subject in another image. The addition of a distance sensor on a camera, to provide an accurate measurement between one or both camera balls to the subject of interest, would produce a vastly improved outcome in the production of a "common coordinate system" between captured images. Examples in this specification, while describing the use of crude calculations to produce a "common coordinate system," anticipate refinements possible with supplemental sensors and technologies.

It is further understood that the phrases "common coordinate system," "shared coordinate system," "uniform coordinate system" et al. used in this specification may be derived using a combination of methods known to those skilled in the art of stitching. For example, two cameras with respective orientation sensors and position sensors may generate images that can be crudely transformed to a substantially similar orientation relative to Earth. Subsequent processes employed within an image capture system may analyze pixels to determine respective image resolutions, aspect ratios, common edge boundaries and common pixel patterns, these processes making possible improvements to the "shared coordinate system" in order to improve, for example, the integrity of stitching the images together. It is anticipated that these and other algorithms, approaches and technologies may supplement the creation of a "shared coordinate system" between multiple camera balls of this invention.

It is anticipated that data communicated from one device to another device over a short-range wireless network can alternatively be communicated via a wired connection such as USB or FireWire. Wireless communications may include LAN, WAN, Internet-based connections, WIFI, Bluetooth, satellite and cloud-based systems.

It is anticipated that a camera projected into a trajectory may roll, float, submerge, bounce or otherwise move to the endpoint of the trajectory, the endpoint being the point at which the ball is at rest. The camera of this invention may benefit from operation at any orientations and positions between and including its initial projection point and its endpoint.

It is further anticipated that the throwable camera of this invention may remain continuously operational through its projection into a first trajectory, its arrival at a resting point, its stationary position during a resting period, and its projection into subsequent trajectory. It is anticipated that the throwable camera of this invention may sleep at a resting point in order to conserve power, and awaken when thrown into a subsequent trajectory. It is further anticipated that the throwable camera of this invention may sleep during the airborne portion of its trajectory to conserve power, awakening during the rolling portion of its trajectory, or at a resting point, or at a resting point between multiple trajectories. It is anticipated that a sensor may initiate a sleep mode, or an awaken mode.

It is anticipated that an instruction from a network device may command a network camera to perform a function including but not limited to initiate sleep mode, power off, power on, reset to factory default state, initiate image capture, switch modes of operation, designate a master network camera or a slave network camera, designate a frequency for transmission over the network, switch network channels for communication independent of other network devices, enable or disable individual sensors, replace input from a sensor with input from a sensor available from a network camera, relay instructions to and from a second network camera, report status of any network camera, relay image and sensor data to and from any network device, or serve as a repeater in the extension of the range of the network. These exemplary instructions should be considered for descriptive purposes and not for purposes of limitation.

It is anticipated that image stitching may occur on non-linear boundaries between two images, including but not limited to curvilinear boundaries and high-frequency edge boundaries.

It is anticipated that cameras and devices described herein will require components including but not limited to microprocessors, ROM and RAM memory. Cameras and devices described herein that do not expressly comprise components including but not limited to processors, ROM and RAM memory should not be interpreted as having a limitation precluding the cameras and devices from comprising and utilizing such components in any workflow.

The embodiments of cameras, image capture apparatuses and image capture systems described herein are anticipated to be applicable to electromagnetic radiation both visible to the human eye and invisible, including but not limited to ultraviolet and infrared imagers.

It is anticipated that images and environmental data from cameras, cloud-based archives, satellite imagery, and CGI computers may be used as sources of image data for target recognition, restorative processing of gaps between and holes in acquired images, pixel enhancement of acquired images, supplements to existing pixel information, comparative operations and composition of a complete image, location sensing and other processes enhancing operation of the camera and network devices of this invention.

The advent of high-speed non-volatile memory such as flash drives makes possible the merging of traditional uses for mass storage such as archiving with uses requiring rapid data access such as image processing and video streaming. It is anticipated that the network and network devices of this invention are capable of communicating in real time, acquiring, processing, transmitting and displaying image data in real time. Storage media described herein are not limited in access time less than state-of-the art volatile memory (RAM), array drives, or other high-speed storage technologies, as well as future technologies capable of storing information in a non-volatile state at the equivalent rate as storage in volatile memory.

It is anticipated that stitching and other operations between neighboring images may be performed irrespective of image shapes, resolutions, aspect rations and dimensions. Real-time stitching of two image portions each comprising a single line of image data are anticipated. It is anticipated that as few as two pixels from neighboring images generated by unique cameras may be stitched together without any more data than the two pixels existing in memory available as in input to the stitching processor, the resulting stitched pixels forming the seed of an input for an iterative operation in generating a larger image.

Parallel processing on a local device and by network devices makes possible the generation of image data with the simultaneous processing of image data. It is anticipated that a function may be performed within a network camera on a portion of an image while a second network device operates on a second portion of the same image. As an example, a single frame of a video image may be generated by a network camera, stored on a network memory and processed for user display in a streaming video before a second image is generated and stored as a second video frame. As another example, two source images generated by network cameras may be stitched into a complete image by a network device without either source image ever being stored in its entirety at one time in the memory of the device.

CONCLUSION

The foregoing Detailed Description has disclosed to those skilled in the relevant disciplines how to make and use the system for operating image capture apparatuses and systems of the invention and has also disclosed the best mode presently known to the inventor of making and using such system. It will however be immediately apparent to those skilled in the relevant disciplines that image capture apparatuses and systems made according to the principles of the invention may be implemented in many ways other than the ways disclosed herein. For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

The invention claimed is:

1. An image capture apparatus comprising:
a substantially spherical housing suitable for being projected into an airborne trajectory;
at least one camera positioned in the housing with at least a partial view to the exterior environment;
at least one orientation sensor positioned in the housing that determines an orientation of the image capture apparatus with respect to ground; and
a processing unit having inputs electrically connected to the at least one camera and the at least one orientation sensor; wherein
the processing unit determines a direction the at least one camera is facing using the orientation of the image camera apparatus with respect to ground, and
the processing unit generates a video comprising a first captured image followed by a second captured image.

2. The image capture apparatus of claim 1 further comprising a transmitter positioned in the housing for sending the video wirelessly; wherein
the video is transmitted to a ground-based user.

3. The image capture apparatus of claim 1 wherein
the processing unit triggers an image capture in response to the orientation of the image capture apparatus with respect to ground.

4. The image capture apparatus of claim 1 wherein
the processing unit rotates a captured image in response to the orientation of the image capture apparatus with respect to ground.

5. The image capture apparatus of claim 1 wherein
the processing unit orders the images comprised in the video in response to the orientation of the image capture apparatus with respect to ground.

6. An image capture apparatus comprising:
a substantially spherical housing suitable for being projected into an airborne trajectory;
at least one camera positioned in the housing having at least a partial view to the exterior environment;
at least one orientation sensor positioned in the housing that determines an orientation of the image capture apparatus with respect to ground;
a processing unit having inputs electrically connected to the at least one camera and the at least one orientation sensor; and
a transmitter for sending an image wirelessly; wherein
a captured image and the orientation of the image capture apparatus with respect to ground at the time of the image capture are transmitted to a ground-based user.

7. The image capture apparatus of claim 6 further comprising:
at least one position sensor positioned in the housing that determines a relative position of the image capture apparatus along its trajectory.

8. The image capture apparatus of claim 7 wherein the at least one position sensor comprises at least one of a time reference, an accelerometer, an altitude sensor, or a gyroscope.

9. The image capture apparatus of claim 6 further comprising:
at least one position sensor positioned in the housing that determines an absolute position of the image capture apparatus along its trajectory.

10. The image capture apparatus of claim 9 wherein the at least one position sensor comprises at least one GPS sensor.

11. An image capture system comprising:
a first substantially spherical housing suitable for being projected into an airborne trajectory comprising a first camera, a first orientation sensor that determines an orientation of the first substantially spherical housing with respect to ground, and a first network interface for wirelessly transmitting a first captured image and first orientation data, wherein the first orientation data indicates the orientation of the first substantially spherical housing at substantially the same time as the capture of the first image;
a second substantially spherical housing suitable for being projected into an airborne trajectory comprising a second camera, a second orientation sensor that determines an orientation of the second substantially spherical housing with respect to ground, and a second network interface for wirelessly transmitting a second captured image and second orientation data, wherein the second orientation data indicates the orientation of the second substantially spherical housing at substantially the same time as the capture of the second image;
a client device comprising a memory, a third network interface which is wirelessly connected to the first network interface and the second network interface, and an image processor, wherein:
the client device receives the first image, the first orientation data, the second image, and the second orientation data, and
the image processor rotates the first image in response to the first orientation data, and stitches the rotated first image and the second image together.

12. The image capture system of claim 11 wherein the image processor stitches together the rotated first image and the second image to obtain a substantially seamless panoramic image.

13. The image capture system of claim 12 wherein the substantially seamless panoramic image is a spherical panoramic image.

14. The image capture system of claim 11 wherein the client device comprises a third camera and wherein the image processor stitches the rotated first image, the second image, and a third image from the third camera together.

15. The image capture system of claim 12 further comprising a user request processor, wherein:
the user request processor comprises an input device and a display;
the image processor stores the substantially seamless panoramic image in the memory; and
the user request processor receives a request from a user through the input device, and, in response to the request, displays at least a portion of the substantially seamless panoramic image.

16. The image capture system of claim 15 wherein the image processor and the user request processor are the same processor.

17. An image capture system comprising:
a first substantially spherical housing suitable for being projected into an airborne trajectory comprising a first camera, a first orientation sensor that determines an orientation of the first substantially spherical housing with respect to ground, a first position sensor that determines a position of the first substantially spherical housing along its trajectory, and a first network interface for wirelessly transmitting a first captured image, first orientation data, and first position data, wherein the first orientation data and the first position data indicate the orientation and position of the first substantially spherical housing at substantially the same time as the capture of the first image;
a second substantially spherical housing suitable for being projected into an airborne trajectory comprising a second camera, a second orientation sensor that determines an orientation of the second substantially spherical housing with respect to ground, a second position sensor that determines a position of the second substantially spherical housing along its trajectory, and a second network interface for wirelessly transmitting a second captured image, second orientation data, and second position data, wherein the second orientation data and the second position data indicate the orientation and position of the second substantially spherical housing at substantially the same time as the capture of the second image; and
a client device comprising a third network interface and an image processor, wherein:
the third network interface is wirelessly connected to the first network interface and the second network interface,
the client device receives the first image, the first orientation data, the first position data, the second image, the second position data, and the second orientation data, and
the image processor compiles the first image and the second image into a video in response to the first position data and the second position data.

18. The image capture system of claim 17 wherein the first position sensor comprises at least one of a GPS sensor, a time reference, an accelerometer, a motion sensor, an altitude sensor, an impact sensor, a gyroscope, or a light-sensitive sensor.

19. The image capture system of claim 17 wherein the first position sensor and the first orientation sensor comprise a single sensor.

20. The image capture system of claim 17, wherein the image processor stitches the first captured image and the second captured image together in response to the first position data and the second position data.

21. The image capture system of claim 17, wherein the image processor, in response to the first position data and the second position data, stitches the first captured image and the second captured image to obtain a substantially seamless panoramic image.

22. The image capture system of claim 21 wherein the panoramic image is a spherical panorama.

23. An image capture system comprising:
an image capture apparatus comprising a substantially spherical housing suitable for being projected into an airborne trajectory;
the image capture apparatus comprising at least one camera positioned in the housing having at least a partial view to the exterior environment;
the image capture apparatus comprising at least one orientation sensor positioned in the housing that determines an orientation of the image capture apparatus with respect to ground;
the image capture apparatus wirelessly connected to a network; and
a client device wirelessly connected to the image capture apparatus on the network; wherein
the image capture apparatus provides the client device with a captured image and the orientation of the image capture apparatus with respect to ground at the time of the image capture; and wherein
the client device comprises a processor that rotates the image using the orientation of the image capture apparatus at the time of the image capture.

24. An image capture system comprising:
an image capture apparatus comprising a substantially spherical housing suitable for being projected into an airborne trajectory;
the image capture apparatus comprising at least one camera positioned in the housing, the at least one camera having at least a partial view to the exterior environment;
the image capture apparatus comprising at least one orientation sensor positioned in the housing that determines an orientation of the image capture apparatus with respect to ground;
the image capture apparatus comprising a processor positioned in the housing having inputs electrically connected to the at least one camera and the at least one orientation sensor;
the processor obtaining first orientation data in response to a signal from the at least one orientation sensor, the first orientation data representing the orientation of the image capture apparatus with respect to ground at substantially the same time as an image capture of a first image by the at least one camera;
the processor obtaining second orientation data in response to a signal from the at least one orientation sensor, the second orientation data representing the orientation of the image capture apparatus with respect to ground at substantially the same time as an image capture of a second image by the at least one camera;
the image capture apparatus wirelessly connected to a network; and
a client device wirelessly connected to the network; wherein
the image capture apparatus wirelessly transmits the first image, the first orientation data, the second image, and the second orientation data to the client device on the network.

25. The image capture system of claim 24 wherein
the client device comprises an image processor that rotates the first image in response to the first orientation data; and
the image processor stitches the rotated first image to the second image to obtain a substantially seamless panoramic image.

26. The image capture system of claim 25 wherein the substantially seamless panoramic image is a spherical panoramic image.

27. A method implemented by an image camera apparatus suitable for being projected into an airborne trajectory, the method comprising:
capturing a first image using a camera at a first time;
determining, using an orientation sensor, a first orientation of the image camera apparatus with respect to ground at substantially the first time;

determining a first direction the camera is facing using the first orientation of the image camera apparatus with respect to ground;

capturing a second image using the camera at a second time;

determining, using the orientation sensor, a second orientation of the image camera apparatus with respect to ground at substantially the second time;

determining a second direction the camera is facing using the second orientation of the image camera apparatus with respect to ground;

generating a video comprising the first image followed by the second image.

28. The method of claim 27, wherein the first image is captured in response to the first orientation.

* * * * *